(12) United States Patent
McKee et al.

(10) Patent No.: US 12,714,112 B2
(45) Date of Patent: Aug. 25, 2026

(54) MODULAR COOKING APPLIANCE HAVING A HOT AIR OVEN

(71) Applicant: Automation Tech, LLC, Elgin, IL (US)

(72) Inventors: Philip R. McKee, Dallas, TX (US); Lee VanLanen, McKinney, TX (US)

(73) Assignee: Automation Tech, LLC, Elgin, IL (US)

( * ) Notice: Subject to any disclaimer, the term of this patent is extended or adjusted under 35 U.S.C. 154(b) by 912 days.

(21) Appl. No.: 17/219,135

(22) Filed: Mar. 31, 2021

(65) Prior Publication Data

US 2021/0307335 A1 Oct. 7, 2021

Related U.S. Application Data

(63) Continuation-in-part of application No. 16/838,540, filed on Apr. 2, 2020, now Pat. No. 12,239,255.

(51) Int. Cl.
*A21B 1/26* (2006.01)
*A21B 1/52* (2006.01)
*A21B 3/07* (2006.01)

(52) U.S. Cl.
CPC .................. *A21B 1/26* (2013.01); *A21B 1/52* (2013.01); *A21B 3/07* (2013.01)

(58) Field of Classification Search
CPC .. A21B 1/245; A21B 1/52; A21B 1/26; A21B 3/07; F24C 15/34
See application file for complete search history.

(56) References Cited

U.S. PATENT DOCUMENTS 2,104,024 A 1/1938 Conbole
2,742,557 A 4/1956 Macoicz
(Continued)

FOREIGN PATENT DOCUMENTS

CA 2644980 A1 9/2007
CN 2784779 Y 5/2006
(Continued)

OTHER PUBLICATIONS

International Searching Authority, Notification of Transmittal of the International Search Report and the Written Opinion of the International Searching Authority, or the Declaration, PCT/US21/24607, Date of Mailing—Jun. 24, 2021, 12 pp., United States.
(Continued)

*Primary Examiner* — Edward F Landrum
*Assistant Examiner* — Kuangyue Chen
(74) *Attorney, Agent, or Firm* — Amster, Rothstein & Ebenstein LLP

(57) ABSTRACT

A modular cooking apparatus is disclosed. The modular cooking apparatus includes a housing for containing a first and second interchangeable cooking modules. The first interchangeable cooking module contains a first oven, and the second interchangeable cooking module contains a second oven. The second oven is a different oven type from the first oven. The first oven includes a cooking cavity and is configured to provide a plurality of non-laminar streams of heated air to the cooking cavity. The modular cooking apparatus also includes a single power plug for receiving electrical power from a wall outlet.

29 Claims, 16 Drawing Sheets

(56) References Cited

U.S. PATENT DOCUMENTS 3,028,472 A 4/1962 Baird
3,320,396 A 5/1967 Helmut
3,557,333 A 1/1971 McAvoy
3,619,536 A 11/1971 Helmut
3,827,346 A 8/1974 Tropp et al.
3,884,213 A 5/1975 Smith
4,154,861 A 5/1979 Smith
4,180,049 A 12/1979 Carr et al.
4,246,462 A 1/1981 Meisel
4,455,478 A 6/1984 Guibert
4,566,804 A 1/1986 Collins et al.
4,949,629 A 8/1990 Leary et al.
4,972,824 A 11/1990 Luebke et al.
5,025,775 A 6/1991 Crisp
5,039,535 A 8/1991 Lang et al.
5,172,682 A 12/1992 Luebke et al.
5,223,008 A 6/1993 Troxell
5,277,105 A 1/1994 Bruno et al.
5,421,316 A * 6/1995 Heber .................... A21B 1/245 432/145
5,878,738 A 3/1999 Poirier
5,906,485 A 5/1999 Groff et al.
5,994,683 A 11/1999 Braunisch et al.
6,518,553 B1 2/2003 Leykin et al.
6,572,911 B1 6/2003 Corcoran et al.
6,691,698 B2 2/2004 Gunawardena et al.
6,712,064 B2 3/2004 Stacy et al.
7,053,349 B2 5/2006 Jeong
7,087,872 B1 8/2006 Dobie et al.
7,220,944 B2 5/2007 Miller
7,592,570 B2 9/2009 Yoder et al.
8,093,538 B2 1/2012 Claesson et al.
8,319,160 B2 11/2012 Koschberg et al.
8,384,000 B2 2/2013 Ruffing et al.
8,578,585 B2 11/2013 Dettloff
9,163,877 B2 10/2015 Lopez et al.
9,288,997 B2 3/2016 McKee
9,516,704 B2 12/2016 Stanger
9,775,358 B2 10/2017 McKee
9,857,082 B2 1/2018 McKee
9,879,865 B2 1/2018 McKee et al.
10,140,587 B2 11/2018 Garden
10,184,722 B1 1/2019 Ingle
10,492,641 B2 12/2019 Kestner et al.
10,684,022 B2 6/2020 McKee et al.
10,729,144 B2 8/2020 McKee et al.
10,765,119 B2 9/2020 Johnson et al.
11,011,909 B1 5/2021 Gurin
2002/0003140 A1 1/2002 Day et al.
2003/0056658 A1 3/2003 Jones et al.
2004/0262286 A1 12/2004 Henke et al.
2005/0193901 A1 9/2005 Buehler
2005/0224064 A1 10/2005 Stockley
2005/0255208 A1 11/2005 Shei
2006/0007059 A1 1/2006 Bell
2006/0163238 A1 7/2006 Miller et al.
2006/0266349 A1 11/2006 Beck et al.
2007/0246451 A1 10/2007 Willett
2008/0083729 A1 4/2008 Etheredge et al.
2008/0092754 A1 4/2008 Noman
2008/0105136 A1 5/2008 McFadden
2008/0283035 A1 11/2008 McKee et al.
2009/0194090 A1 8/2009 Kim et al.
2009/0236331 A1 9/2009 McKee et al.
2010/0071565 A1 3/2010 Backus et al.
2010/0247721 A1 9/2010 Mcghee, Jr. et al.
2010/0276413 A1 11/2010 Nam et al.
2011/0083657 A1 4/2011 Ploof et al.
2011/0114634 A1 5/2011 Nevarez
2011/0120990 A1 5/2011 Heimerdinger
2011/0139140 A1 6/2011 Baker et al.
2011/0241503 A1 10/2011 Simon
2012/0111857 A1 5/2012 McKee et al.
2012/0308702 A1 12/2012 Khatchadourian et al.
2013/0008893 A1 1/2013 Little et al.
2013/0156906 A1 6/2013 Raghavan et al.
2013/0177683 A1 7/2013 Shei et al.
2013/0202761 A1 8/2013 McKee
2013/0213951 A1 8/2013 Boedicker et al.
2014/0326710 A1 11/2014 McKee et al.
2014/0370167 A1 12/2014 Garden
2015/0017305 A1 1/2015 Olver et al.
2015/0096974 A1 4/2015 Freeman et al.
2015/0181655 A1 6/2015 McKee et al.
2015/0241069 A1 8/2015 Brant et al.
2015/0327726 A1 11/2015 Betzold et al.
2016/0025350 A1 1/2016 Goble et al.
2016/0068689 A1 3/2016 Lang
2016/0215989 A1 7/2016 Buller-Colthurst
2016/0258634 A1 9/2016 Helm et al.
2016/0296012 A1 10/2016 Ciccacci et al.
2016/0330978 A1 11/2016 Schjerven, Sr. et al.
2017/0071411 A1 3/2017 Veltrop et al.
2017/0095105 A1 4/2017 Clark et al.
2017/0095106 A1 4/2017 Cook
2017/0156347 A1 6/2017 Reese et al.
2017/0290345 A1 10/2017 Garden et al.
2017/0318629 A1 11/2017 Mohseni
2018/0004276 A1 1/2018 Wong et al.
2018/0103803 A1 4/2018 Laub et al.
2018/0152991 A1 5/2018 Hall et al.
2018/0235396 A1 8/2018 Schönenberger
2019/0050804 A1 2/2019 Garden
2019/0056118 A1 2/2019 McKee et al.
2019/0098921 A1 4/2019 Park et al.
2019/0117019 A1 4/2019 Minard
2019/0141798 A1 5/2019 Cheng et al.
2019/0166850 A1 6/2019 Bailie
2019/0223474 A1 7/2019 Lee
2019/0234617 A1 8/2019 Bhogal et al.
2019/0239517 A1 8/2019 McKee et al.
2019/0239518 A1 8/2019 McKee et al.
2019/0242587 A1 8/2019 McKee et al.
2019/0315224 A1 10/2019 Mitidieri et al.
2020/0018489 A1 1/2020 Lee et al.
2020/0037816 A1 2/2020 Hackley
2020/0064056 A1 2/2020 Hall et al.
2020/0090226 A1 3/2020 Garden et al.
2020/0187510 A1 6/2020 Wolfe et al.
2020/0200393 A1* 6/2020 Goldberg ................ F24C 7/088
2021/0161151 A1 6/2021 Thorogood et al.
2021/0307335 A1 10/2021 McKee et al.
2021/0307336 A1 10/2021 McKee et al.
2021/0307560 A1 10/2021 McKee et al.
2021/0310660 A1 10/2021 McKee et al.
2021/0310662 A1 10/2021 McKee et al.

FOREIGN PATENT DOCUMENTS

CN 101277558 A 10/2008
CN 101287376 A 10/2008
CN 101933528 A 1/2011
CN 101953645 A 1/2011
CN 102401562 A 4/2012
CN 202209709 U 5/2012
CN 103156532 A 6/2013
CN 104272865 A 1/2015
CN 107461772 A 12/2017
CN 107920688 A 4/2018
CN 108459538 A 8/2018
CN 109310097 A 2/2019
CN 209047299 U 7/2019
CN 209489913 U 10/2019
DE 19750488 A1 5/1999
DE 10027072 A1 1/2002
EP 1170550 A1 1/2002
EP 1992879 A1 11/2008
EP 2868979 A1 5/2015
EP 3190857 B1 4/2020
GB 120631 A 11/1918
JP 201484919 A2 5/2014
KR 20030000202 A 1/2003
KR 20050100243 A 10/2005
KR 20160084273 A 7/2016

(56) References Cited

FOREIGN PATENT DOCUMENTS

| | | | |
|---|---|---|---|
| TW | 201919478 | A | 6/2019 |
| WO | 1984001424 | A1 | 4/1984 |
| WO | 1997041392 | A2 | 11/1997 |
| WO | 2005096826 | A1 | 10/2005 |
| WO | 2006099394 | A1 | 9/2006 |
| WO | 2007015215 | A2 | 2/2007 |
| WO | 2009088145 | A1 | 7/2009 |
| WO | 2015075587 | A1 | 5/2015 |
| WO | 2018006182 | A1 | 1/2018 |
| WO | 2018112597 | A1 | 6/2018 |
| WO | 2019050615 | A1 | 3/2019 |
| WO | 2019178419 | A1 | 9/2019 |

OTHER PUBLICATIONS

International Searching Authority, Notification of Transmittal of the International Search Report and the Written Opinion of the International Searching Authority, or the Declaration, PCT/US21/24614, Date of Mailing—Jun. 23, 2021, 9 pp., United States.

International Searching Authority, Notification of Transmittal of the International Search Report and the Written Opinion of the International Searching Authority, or the Declaration, PCT/US21/24618, Date of Mailing—Jun. 23, 2021, 10 pp., United States.

International Searching Authority, Notification of Transmittal of the International Search Report and the Written Opinion of the International Searching Authority, or the Declaration, PCT/US21/24630, Date of Mailing—Jul. 9, 2021, 7 pp., United States.

International Searching Authority, Notification of Transmittal of the International Search Report and the Written Opinion of the International Searching Authority, or the Declaration, PCT/US21/24639, Date of Mailing—Jul. 12, 2021, 7 pp., United States.

International Searching Authority, Notification of Transmittal of the International Search Report and the Written Opinion of the International Searching Authority, or the Declaration, PCT/US21/24712, Date of Mailing—Jul. 7, 2021, 10 pp., United States.

International Searching Authority, Notification of Transmittal of the International Search Report and the Written Opinion of the International Searching Authority, or the Declaration, PCT/US21/24714, Date of Mailing—Jun. 28, 2021, 10 pp., United States.

International Searching Authority, Notification of Transmittal of the International Search Report and the Written Opinion of the International Searching Authority, or the Declaration, PCT/US21/24715, Date of Mailing—Jun. 29, 2021, 8 pp., United States.

International Searching Authority, Notification of Transmittal of the International Search Report and the Written Opinion of the International Searching Authority, or the Declaration, PCT/US2021/025339, Date of Mailing—Jul. 12, 2021, 11 pp., United States.

United States Patent and Trademark Office, Office Action for U.S. Appl. No. 16/997,402, Mail Date of December 8. 2021. 11 pp., United States.

Pacific Gas and Electric, PG&E End-Use Briefing, Ovens in Commercial Food Service Operations, May 1997 (Revised Dec. 10, 1999). pp. 1-9. USA.

China National Intellectual Property Administration, Office Action issued in Application No. CN202180025618.1, dated Nov. 6, 2023, 18 pages [Chinese original (9 pages), English translation (9 pages)], Beijing, China.

China National Intellectual Property Administration, Office Action issued in Application No. CN202180025614.3, dated Jun. 17, 2024, 18 pages [Chinese original (12 pages), English translation (5 pages)], Beijing, China.

European Patent Office, Supplementary European Search Report and Opinion for PCT/US2021025339, dated May 10, 2024, 13 pages, Munich, Germany.

European Patent Office, Extended European Search Report and Opinion for PCT/US2021025339, dated Jul. 3, 2024, 16 pages, Munich, Germany.

Zhou Shaolei et al., "New Technologies and Equipment for Efficient Coal Preparation", Introduction and p. 213, China University of Mining and Technology Press, 1st edition, Jun. 30, 2008. [5 pages total: Chinese original (2 pages), English translation (3 pages)].

IP Australia, Examination Report No. 1 issued in Application No. 2021249139, dated Sep. 15, 2023, 3 pages, Phillip ACT, Australia.

IP Australia, Examination Report No. 2 issued in Application No. 2021249139, dated Jul. 17, 2024, 3 pages, Phillip ACT, Australia.

Canadian Intellectual Property Office, Examination Report issued in Application No. 3,172,612, dated Jan. 30, 2024, 3 pages, Gatineau, Quebec, Canada.

* cited by examiner

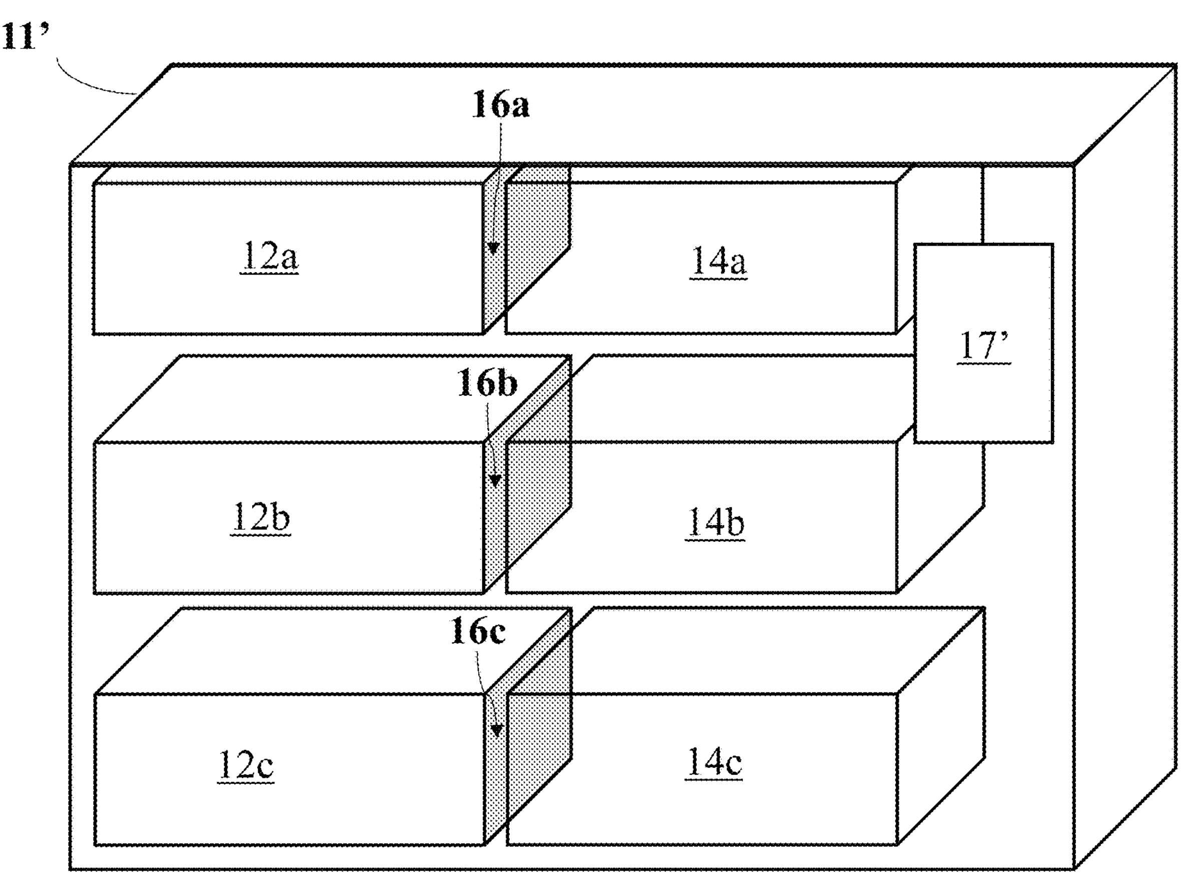
Figure 1A

| FOOD ENTRY TABLE | | | | | | | | | | | | | | | | | |
|---|---|---|---|---|---|---|---|---|---|---|---|---|---|---|---|---|---|
| OVEN MODULE | FOOD TYPE | COOK STAGE 1 | | | | | COOK STAGE 2 | | | | | COOK STAGE 3 | | | | | |
| | | From | To | Temp | Blower | Mag | From | To | Temp | Blower | Mag | From | To | Temp | Blower | Mag | |
| impingement | pizza | 0 | 30 | 400 | 50 | | 31 | 50 | 400 | 100 | | 51 | 90 | 425 | 80 | | |
| impingement | sandwich | 0 | 20 | 425 | 100 | | 21 | 50 | 400 | 100 | | 51 | 70 | 425 | 60 | | |
| convection | biscuits | 0 | 50 | 350 | 100 | | 51 | 100 | 350 | 100 | | 101 | 120 | | | | |
| microwave | hot dog | 0 | 50 | | | 100 | 51 | 70 | | | 0 | 71 | 90 | | | 50 | |

Figure 9A

| MAXIMUM CURRENT DRAWN TABLE | | | | |
|---|---|---|---|---|
| OVEN MODULE | FOOD TYPE | COOK STAGE 1 | COOK STAGE 2 | COOK STAGE 3 |
| impingement | pizza | 32 | 32 | 32 |
| Impingement | sandwich | 32 | 32 | 32 |
| convection | biscuits | 28 | 28 | 28 |
| microwave | hot dog | 16 | 0 | 8 |

Figure 9B

| CURRENT DRAWN HISTORY TABLE | | | | | | | | | |
|---|---|---|---|---|---|---|---|---|---|
| OVEN MODULE | FOOD TYPE | Time Unit 1 | Time Unit 2 | Time Unit 3 | Time Unit 4 | Time Unit 5 | Time Unit 6 | Time Unit 7 | Time Unit 8 |
| impingement | pizza | 3.2 | 5.6 | 5.6 | 5.6 | 5.6 | 5.6 | 2.8 | 2.8 |
| impingement | sandwich | 5.6 | 5.6 | 5.6 | 5.6 | 5.6 | 5.6 | | |
| convection | biscuits | 2.8 | 2.8 | 3.2 | 3.2 | 3.2 | 3.2 | 3.2 | 3.2 |

Figure 9C

MODULAR COOKING APPLIANCE HAVING A HOT AIR OVEN

CROSS-REFERENCE TO RELATED APPLICATIONS

The present application is a continuation-in-part of U.S. patent application Ser. No. 16/838,540, filed on Apr. 2, 2020, and entitled "Modular Cooking Appliance," the contents of which are incorporated herein by reference in their entirety.

TECHNICAL FIELD

The present invention relates to cooking appliances in general, and in particular to a modular cooking appliance having multiple ovens capable of cooking various food types concurrently.

BACKGROUND

In order to cook and serve a wide variety of food items, such as pizzas, bakery products, breakfast sandwiches, proteins, etc., food-service operators generally have to possess different kinds of ovens at the same store location. Different operating skills are typically required to utilize each of the different kinds of ovens for cooking, and multiple ovens tend to occupy valuable countertop spaces and require multiple electrical power plugs.

The use of streams of one-directional, heated air to cook food items is well known in the art, and is illustrated in, for example, U.S. Pat. Nos. 3,884,213 and 6,049,066. As also disclosed in U.S. Pat. No. 3,884,213, the movement of the food items to provide relative motion between the food items and the streams of one-directional, heated air is important when using such streams of one-directional, heated air to heat all of the surfaces of the food item.

The present disclosure provides an improved cooking appliance that can streamline the cooking task of a food-service operator, including by providing for the cooking of food items using streams of heated air without having to provide relative motion between the food items and the streams of heated air.

SUMMARY OF THE INVENTION

In accordance with one embodiment of the present invention, a modular cooking apparatus includes a housing for containing a first and second interchangeable cooking modules. The first interchangeable cooking module contains a first oven, and the second interchangeable cooking module contains a second oven. The second oven is a different oven type from the first oven. The first oven includes a cooking cavity and is configured to provide a plurality of non-laminar streams of heated air to the cooking cavity. The modular cooking apparatus also includes a single power plug for receiving electrical power from a wall outlet.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1A is an isometric view of the structure of a modular cooking appliance, according to an alternative embodiment;

FIG. 9A shows an example of a Food Entry Table within the modular cooking appliance from FIG. 1;

FIG. 9B shows an example of a Maximum Current Drawn Table within the modular cooking appliance from FIG. 1;

FIG. 9C shows an example of a Current Drawn History Table within the modular cooking appliance from FIG. 1.

DETAILED DESCRIPTION OF PREFERRED EMBODIMENTS

I. Configuration of Modular Cooking Appliance

Figure 1:
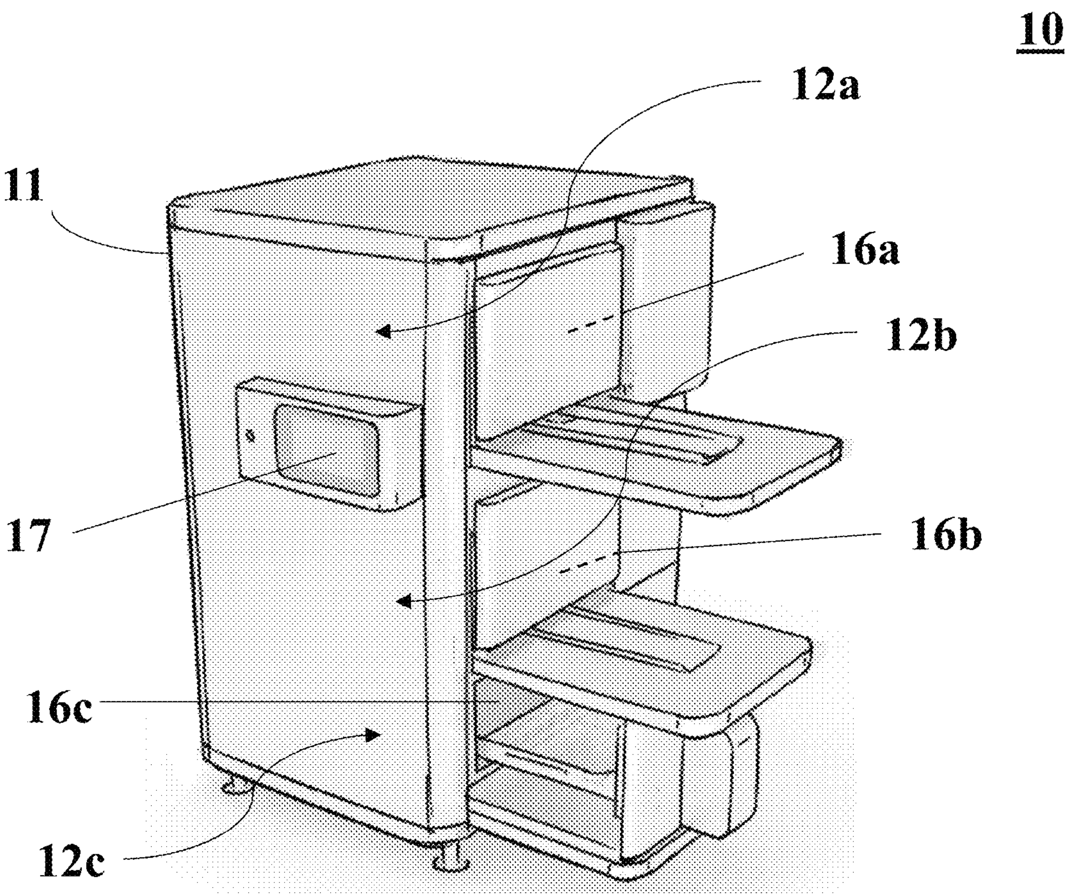
FIG. 1 is an isometric view of a modular cooking appliance, in accordance with one embodiment.

Referring now to the drawings and in particular to FIG. 1, there is depicted an isometric view of a modular cooking appliance, in accordance with one embodiment. As shown, a modular cooking appliance 10 is defined by a housing 11 containing multiple interchangeable cooking modules. For the present embodiment, housing 11 includes interchangeable cooking modules 12*a*-12*c*, but it is understood by those skilled in the art that the number of interchangeable cooking modules within housing 11 can be more or less than three. Each of interchangeable cooking modules 12*a*-12*c* is for receiving an oven. The ovens contained within interchangeable cooking modules 12*a*-12*c* may be identical or different from each other. For the present embodiment, interchangeable cooking module 12*a* contains an impingement oven that may be used to cook pizzas, interchangeable cooking module 12*b* contains a convection oven that may be used to cook more delicate yeast-rising food items such as cinnamon rolls, and interchangeable cooking module 12*c* contains a microwave oven that may be used to cook hot dogs.

Alternatively, interchangeable cooking module 12*a* may contain a first convection oven, interchangeable cooking module 12*b* may contain a second convection oven, and interchangeable cooking module 12*c* may contain an impingement oven. Basically, modular cooking appliance 10 may contain any combination of ovens based on the preferences of food-service operators. Any one of interchangeable cooking modules 12*a*-12*c* contained within modular cooking appliance 10 can be swapped out by field service personnel without disturbing other aspects of modular cooking appliance 10.

For the present embodiment, the heights of interchangeable cooking modules 12*a*-12*c* are identical such that the height of housing 11 corresponds to a total number of interchangeable cooking modules installed. Alternatively, the heights of interchangeable cooking modules 12*a*-12*c* may vary from each other, depending on the type of oven contained within. For example, a convection oven that cooks yeast-raised products may be taller than an impingement oven that cooks pizzas. Accordingly, the height of housing 11 will correspond to the total height of the ovens contained within.

Interchangeable cooking modules 12*a*-12*c* include openings 16*a*-16*c*, respectively, to allow food items to be transported into ovens located within interchangeable cooking modules 12*a*-12*c*.

Modular cooking appliance 10 includes a common control panel 17 for controlling all the various ovens and food loading mechanisms contained within interchangeable cooking module 12*a*-12*c*. Each of the food loading mechanisms allows food items to be loaded within a cooking chamber of a respective oven. After food items have been placed on a food loading mechanism, an operator can enter operating parameters, such as cooking temperature, cooking time, blower speed, etc., via control panel 17 to effectuate cooking controls on the food items to be cooked, and the food loading mechanism will automatically transport the food items into the oven to begin cooking.

Alternatively, food items can be manually placed within a cooking chamber of an oven by an operator, without using a food loading mechanism or when there is no food loading mechanism attached to an oven.

Control panel 17 is preferably implemented with a touchscreen but it can also be implemented with keypads and liquid crystal display (LCD) that are well-known in the art.

Referring now to FIG. 1A, there is depicted an isometric view of the structure of modular cooking appliance 10, in accordance with an alternative embodiment. As shown, a modular cooking appliance 10' is defined by a housing 11' containing interchangeable cooking modules 12*a*-12*c*. Each of interchangeable cooking modules 12*a*-12*c* is for receiving an oven, such as a microwave oven, a convection oven, an impingement oven or the like.

Each of interchangeable cooking modules 12*a*-12*c* is associated with one of front-facing slots 14*a*-14*c*, respectively. Openings 16*a*-16*c* allow food items to be transported between ovens located within interchangeable cooking modules 12*a*-12*c* and their associated front-facing slots 14*a*-14*c*. For example, each of front-facing slots 14*a*-14*c* may contain a food loading mechanism for transporting food placed thereon to ovens contained within adjacent interchangeable cooking modules 12*a*-12*c* via corresponding openings 16*a*-16*c*, respectively. Specifically, food placed on a food loading mechanism contained in front-facing slot 14*a* will be transported into an oven contained in interchangeable cooking module 12*a*, food placed on a food loading mechanism contained in front-facing slot 14*b* will be transported into an oven contained in interchangeable cooking module 12*b*, and food placed on a food loading mechanism contained in front-facing slot 14*c* will be transported into an oven contained in interchangeable cooking module 12*c*. After food has been cooked, the food can be returned by the food loading mechanism back to the front-facing slot from which it entered the associated oven.

Modular cooking appliance 10' includes a common control panel 17' for controlling all the various ovens and food loading mechanisms contained within interchangeable cooking module 12*a*-12*c* and front-facing slot 14*a*-14*c*, respectively.

A. Interchangeable Cooking Module

The basic construction of interchangeable cooking modules 12*a*-12*c* are substantially identical to each other. Thus, the basic construction of only interchangeable cooking module 12*a* will be further described in detail.

Figure 1B:
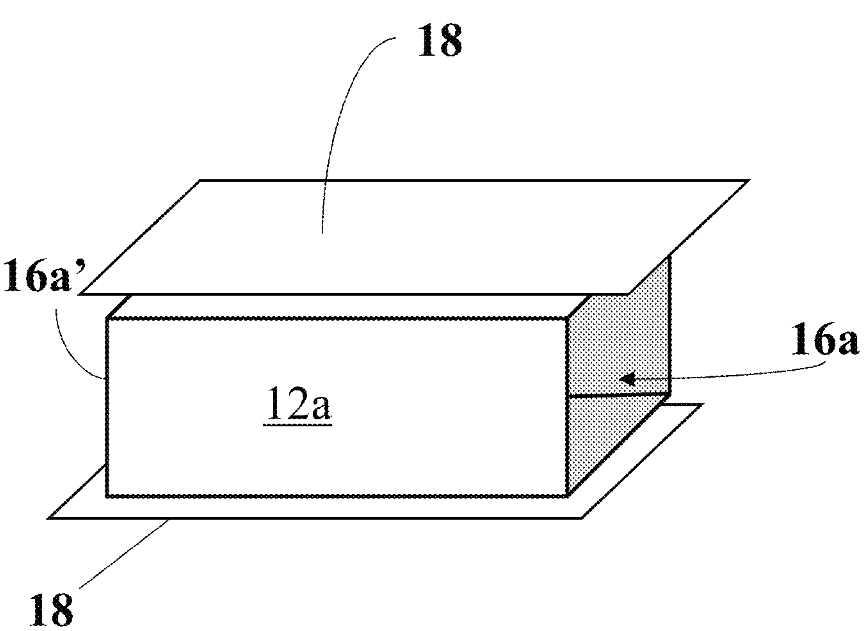
FIG. 1B is an isometric view of an interchangeable cooking module within the modular cooking appliance from FIG. 1A, according to one embodiment.

With reference now to FIG. 1B, there is illustrated an isometric view of interchangeable cooking module 12*a*, in accordance with one embodiment. As shown, interchangeable cooking module 12*a* includes a space for containing an oven (not shown) and two openings, such as openings 16*a* and 16*a'*, on both ends of the space for containing an oven. Along the longitudinal axis, the upper half of interchangeable cooking module 12*a* is substantially identical to the lower half of interchangeable cooking module 12*a* such that either opening 16*a* or opening 16*a'* can be used for passage of food items, depending on the orientation of interchangeable cooking module 12*a* within housing 11. During assembly, one of openings 16*a* and 16*a'* can be closed up with aback wall (see FIG. 1C), after the orientation of interchangeable cooking module 12*a* within housing 11 has been decided.

The top and bottom of interchangeable cooking module 12*a* are formed by insulating surfaces 18. Insulating surfaces 18 include a filling envelope that can be filled with a substance of high specific-heat. For example, after an oven has been placed within interchangeable cooking module 12*a*, a liquid containing a high specific-heat substance in suspension, such as sand or salt suspended in silicone, can be injected into the filling envelope within insulating surfaces 18 until insulating surfaces 18 are fully expanded into the space between insulating surfaces 18 and the oven. Heat energy is stored in the high specific-heat substance when the oven is being heated.

Figure 1C:
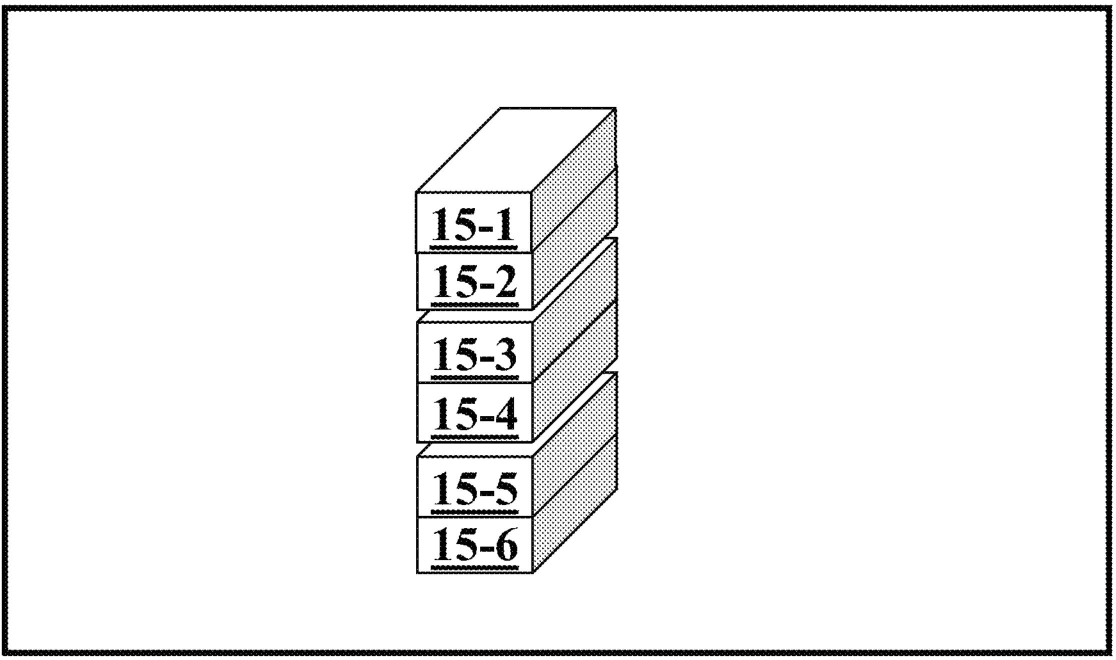
FIG. 1C is an isometric view of a back wall within the interchangeable cooking module from FIG. 1B, according to one embodiment.

Referring now to FIG. 1C, there is illustrated an isometric view of a back wall within interchangeable cooking module 12*a* from FIG. 1B, in accordance with one embodiment. As shown, a back wall includes a set of connectors 15-1 to 15-6. During assembly, an oven module to be placed within interchangeable cooking module 12*a* is fully seeded therein in order to achieve a connection between a subset of connectors 15-1 to 15-6 and the oven module. Each oven type includes a specific set of electrical connectors to be mated with the corresponding ones of connectors 15-1 to 15-6 in order to activate the proper electrical and control network for the operations of the oven. For example, an impingement oven includes electrical connectors for mating with connectors 15-1 and 15-4, a convection oven includes electrical connectors for mating with connectors 15-2 and 15-5, and a microwave oven includes electrical connectors for mating with connectors 15-3 and 15-6.

B. Impingement Oven

Figure 2A:
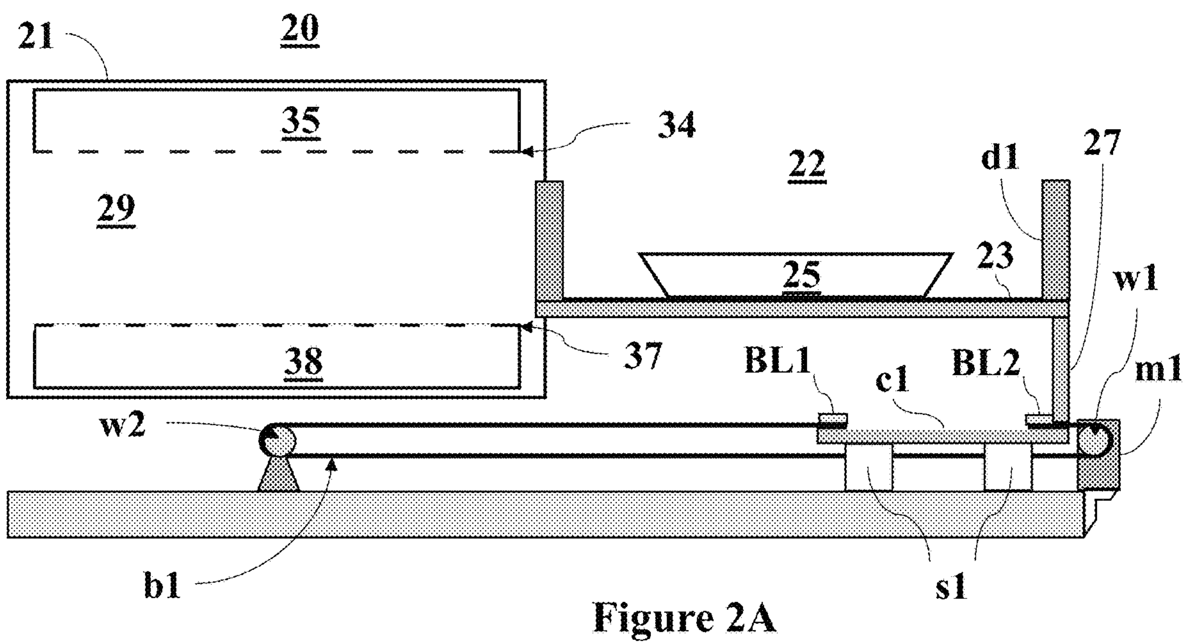
FIGS. 2A-2C are cross-sectional views of an impingement oven within the modular cooking appliance from FIG. 1, according to one embodiment.
Figure 2B:
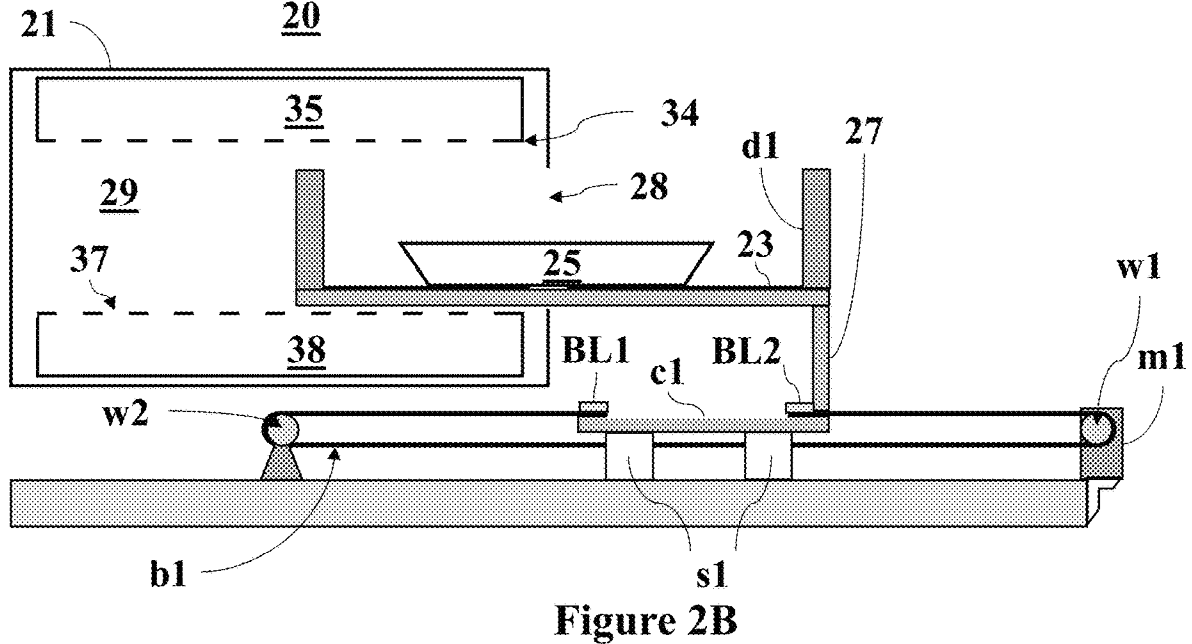
Figure 2C:
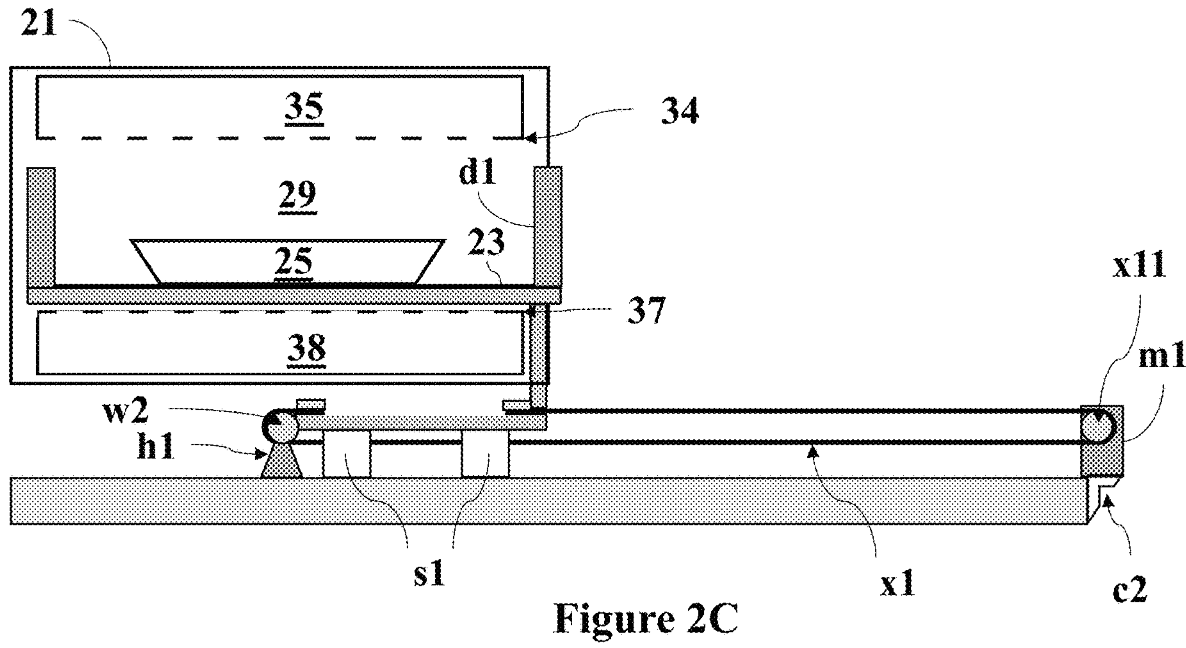

With reference now to FIGS. 2A-2C, there are depicted cross-sectional views of an impingement oven within interchangeable cooking module 12*a* of modular cooking appliance 10 from FIG. 1, in accordance with one embodiment. As shown, an impingement oven 20 includes a housing 21 for accommodating a cooking cavity 29 and a cavity opening 28. Impingement oven 20 also includes a substantially planar food loading platform 23. Food loading platform 23 is configured to receive a cooking plate 25. Any food item intended to be cooked by impingement oven 20 is initially placed on either cooking plate 25 or food loading platform 23. When food items are being cooked, food loading platform 23 and cooking plate 25 are located inside cooking cavity 29, as shown in FIG. 2C.

In addition, housing 21 also contains atop plenum 35 and a bottom plenum 38. Top plenum 35 is connected to top air inlet plate 34. Bottom plenum 38 is connected to a bottom air inlet plate 37. Top air inlet plate 34, top plenum 35, bottom air inlet plate 37 and bottom plenum 38 are part of the heating and airflow system for impingement oven 20 such that heated air in top plenum 35 and bottom plenum 38 are in gaseous communication with cavity 29 through top air inlet plate 34 and bottom air inlet plate 37, respectively. Top air inlet plate 34 and bottom air inlet plate 37 include multiple openings for directing hot pressured airstream towards any food items placed on food loading platform 23 located within cavity 29. It is understood by those skilled in the art that top plenum 35 or bottom plenum 38 could be in gaseous communication with cavity 29 via a variety of air opening configurations such as circular openings, nozzles, tubes, rectangular openings and the like. Moreover, air can enter cavity 29 through only one of top plenum 35 or bottom plenum 38.

Impingement oven 20 is also associated with a food transport system 22. As shown, food transport system 22 includes food loading platform 23 connected to a food transport carriage c1 via a connector 27. Food loading platform 23 can be transported in and out of cooking cavity 29 by a belt drive mechanism that includes a belt b1, a belt drive wheel w1 that is driven by a belt drive motor ml and an opposing belt wheel w2. Belt b1 is connected to carriage c1 via belt locks BL1 and BL2. Carriage c1 is connected to carriage skids s1. For the present embodiment, there are four carriage skids connected to carriage c1, with two front carriage skids s1, as shown in FIG. 2A, and two back carriage skids (not shown) on the opposing side of carriage c1. Belt b1 moves between front carriage skids s1 and back carriage skids. When belt drive motor ml is engaged, belt b1 moves carriage c1, thereby transporting food loading platform 23 in and out of cooking cavity 29 through opening 28, as shown in FIG. 2B.

During the cooking process, food loading platform 23 may be moved to and fro, about 1", for promoting food cooking evenness. In order to move food loading platform 23 to and fro without air escaping through opening 28 during the cooking process, door dl must be sufficiently thick to substantially block air from escaping through opening 28 at either extreme of the to and fro motion.

Operating parameters for impingement oven 20 to cook any food items placed on cooking plate 25 to be carried into cooking cavity 29 can be entered via control panel 17 (from FIG. 1).

Figure 3:
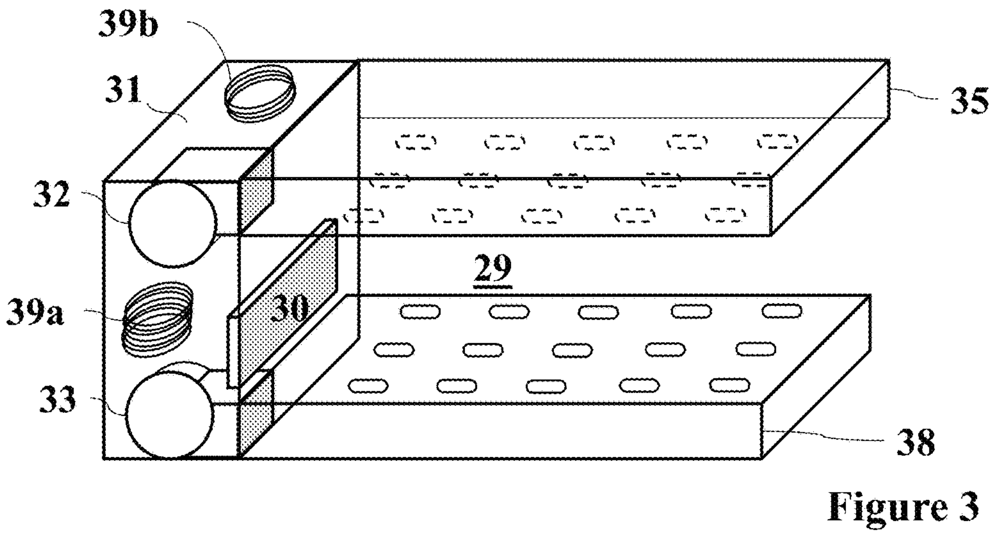
FIG. 3 is a diagram of the heating and airflow system within the impingement oven from FIGS. 2A-2C, according to one embodiment.

With reference now to FIG. 3, there is depicted a diagram of the heating and airflow system within impingement oven 20, in accordance with one embodiment. Air within cooking cavity 29 is initially pumped in to a heater plenum 31 via an intake opening 30. Heater plenum 31 includes a base heater 39*a* and a boost heater 39*b*. After air has been sufficiently heated by base heater 39*a* and boost heater 39*b*, the heated air is then directed to top plenum 35 via a top blower 32 and to a bottom plenum 38 via a bottom blower 33. During cooking, base heater 39*a* is usually turned on, and boost heater 39*b* is only activated when necessary. The pressurized hot air formed within top plenum 35 is subsequently directed to cavity 29 via multiple openings located on top air inlet plate 34 (from FIGS. 2A-2C). Similarly, pressurized hot air formed within bottom plenum 38 is subsequently directed to cavity 29 via multiple nozzles located on bottom air inlet plate 37 (from FIGS. 2A-2C). Although heated air is shown to be sent to top air plenum 35 and bottom plenum 38 via separate blowers, it is understood by those skilled in the art that heated air can be sent to both top plenum 35 and bottom plenum 38 via a single blower.

C. Convection Oven

Figure 4:
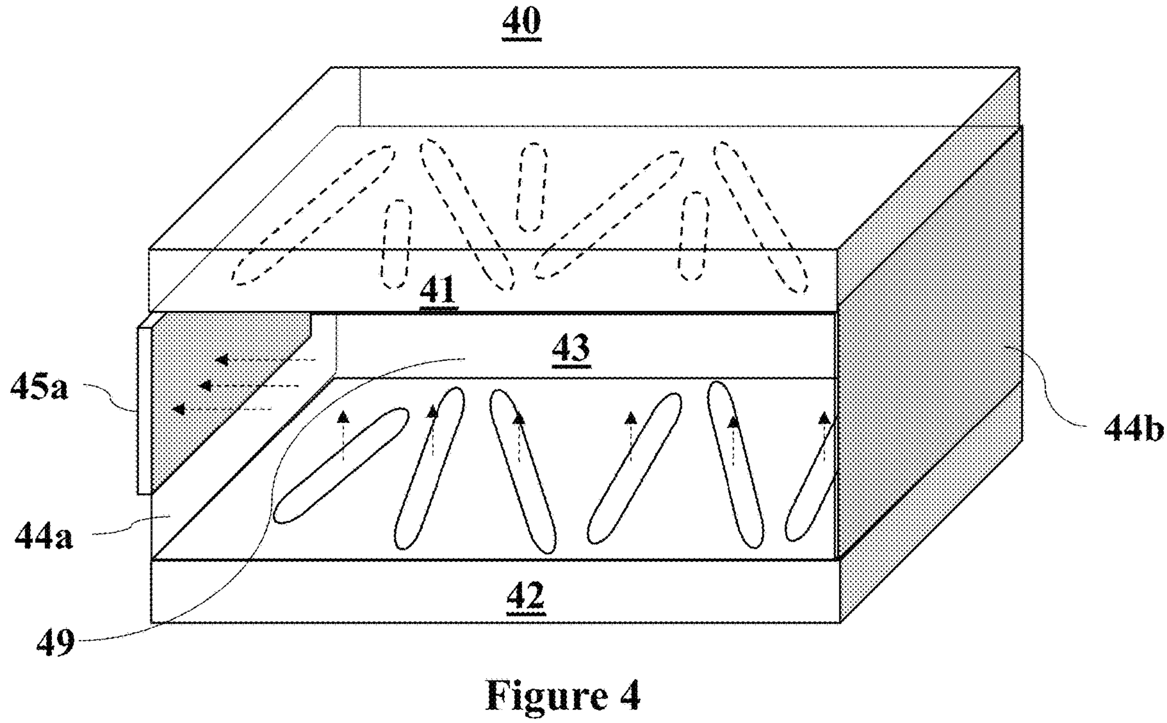
FIG. 4 is an isometric view of a convection oven within the modular cooking appliance from FIG. 1, according to one embodiment.

With reference now to FIG. 4, there is depicted an isometric view of a convection oven within slot 12*b* of modular cooking appliance 10 from FIG. 1, in accordance with one embodiment. As shown, a convection oven 40 includes a housing having a cooking cavity 49 defined by a top air inlet plenum 41, a bottom air inlet plenum 42, a rear wall 43, and two side walls 44*a*, 44*b*. Located on one or more of side walls 44*a*, 44*b* and rear wall 43 are return air openings, such as openings 45*a*, for returning air to a blower system (not shown). Preferably, convection oven 40 also includes a food loading mechanism similar to food loading mechanism 22 shown in FIGS. 2A-2C.

Figure 5:
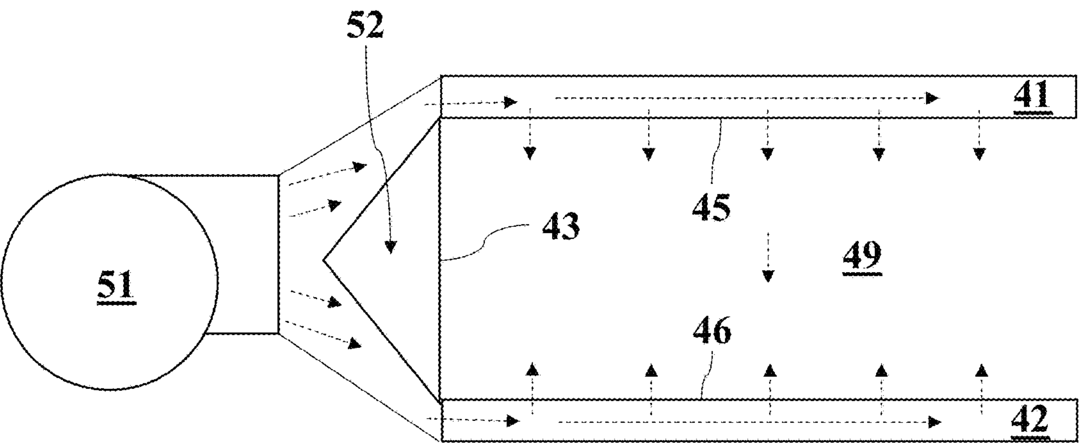
FIG. 5 is a diagram of a heating and airflow system within the convection oven from FIG. 4, according to one embodiment.

Referring now to FIG. 5, there is depicted a cross-sectional view of a heating and airflow system within convection oven 40, in accordance with one embodiment. As shown, a blower 51 is preferably located at the rear of convection oven 40. Heated air from a heater (not shown) is directed by blower 51 over air diverter 52 that separates the air exiting blower 51 into top and bottom airstreams flowing through top and bottom air inlet plenums 41 and 42 and into cooking cavity 49 through top and bottom convection plates 45 and 46. After transferring heat from the heated air to food placed in cooking cavity 49, the air is drawn through return a return air path.

An operator can enter commands, such as cooking temperature, cooking time, fan speed, etc., via control panel 17 (from FIG. 1) to effectuate cooking controls on any food items placed within cooking cavity 49 of convection oven 40.

D. Hot Air Ovens

In accordance with additional embodiments, the heating and airflow systems used in the hot air ovens that are used in modular cooking appliance 10 can be configured to promote food cooking evenness without having to move a food cooking platform (such as food cooking platform 23) to and fro to provide relative motion between the heated air provided by the oven and the food item. The hot air ovens may have a cooking cavity which has a length of about 16 inches and a width of about 16 inches, such that the cooking cavity is large enough to cook a 16-inch pizza.

Figure 6A:
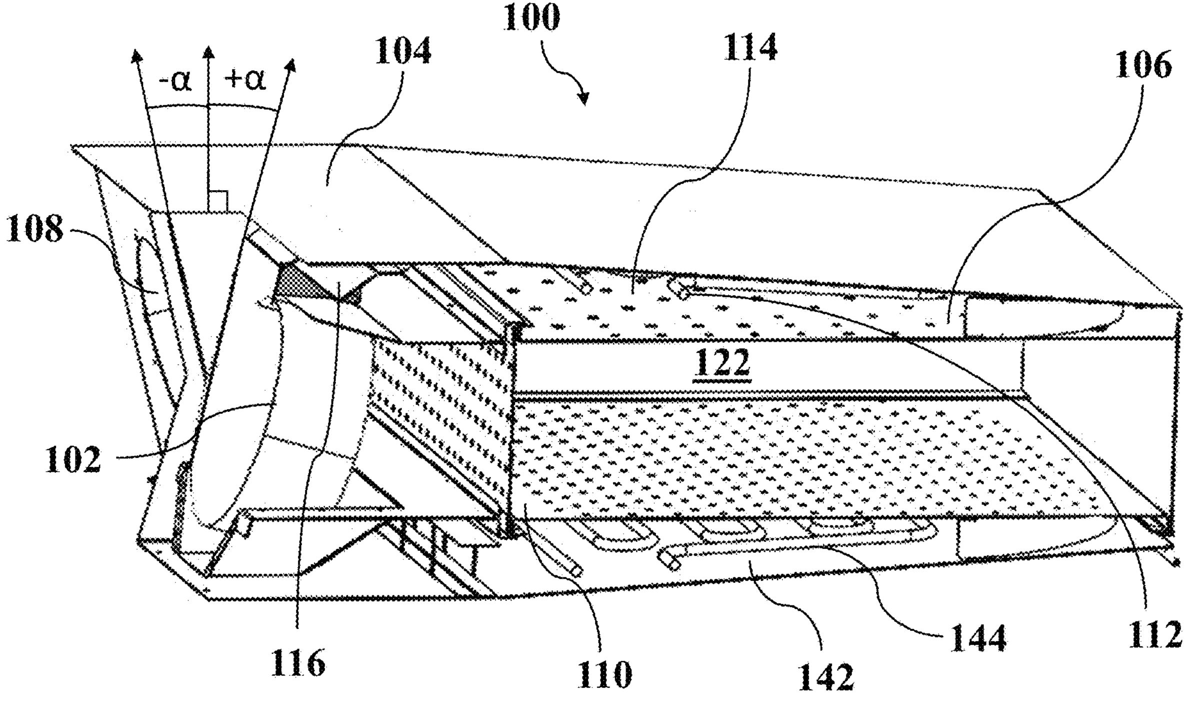
FIG. 6A is a diagram of the heating and airflow system within a hot air oven having angled blowers, according to an alternative embodiment.

FIGS. 6A-6D depict schematic diagrams of a heating and airflow system in accordance with such embodiments. FIG. 6A shows an embodiment of a hot air oven 100 having two blowers. As shown in FIG. 6A, air exiting top blower 102 is immediately directed to a barrier wall 104 that is nearly perpendicular to the direction of the air exiting the blower. Specifically, top blower 102 may be disposed at an angle α with regard to barrier wall 104. Since barrier wall 104 is parallel to top air inlet plate 106, top blower 102 is also disposed at angle α with regard to top air inlet plate 106. In preferred embodiments, top blower 102 may be disposed at an angle α between +100 and +45° with regard to an axis that is perpendicular to top air inlet plate 106. Likewise, bottom blower 108 may be disposed at an angle between −10° and −45° with regard to an axis that is perpendicular to bottom air inlet plate 110 (which is also parallel to barrier wall 104). For purposes of measuring these angles α, a positive angle is one that is clockwise with respect to the perpendicular axis and a negative angle is one that is counter-clockwise with respect to the perpendicular axis.

In embodiments, top blower 102 and bottom blower 108 may each be disposed at the same angles (in terms of absolute value) but in different directions (e.g., top blower 102 may be disposed at an angle α of +10° with respect to the perpendicular axis of top air inlet plate 106 and bottom blower 108 may be disposed at an angle α of −10° with respect to the perpendicular axis of bottom air inlet plate 110). In embodiments, top blower 102 and bottom blower 108 may each be disposed at different angles (in terms of absolute value) in different directions. In embodiments, top blower 102 and bottom blower 108 may each be disposed at the same angles or at different angles in the same direction.

Figure 6B:
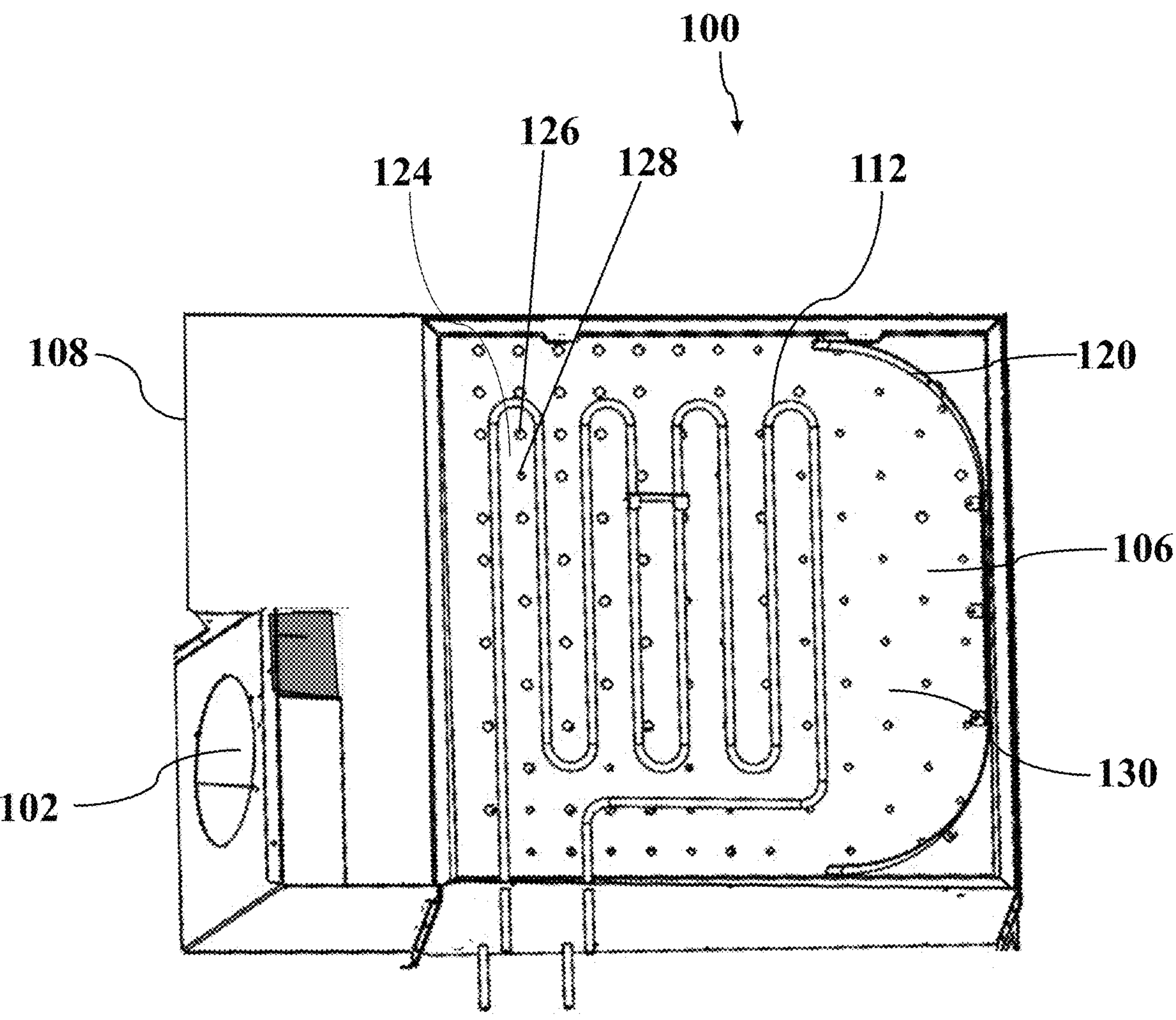
FIG. 6B is a top view of the hot air oven from FIG. 6A.
Figure 6C:
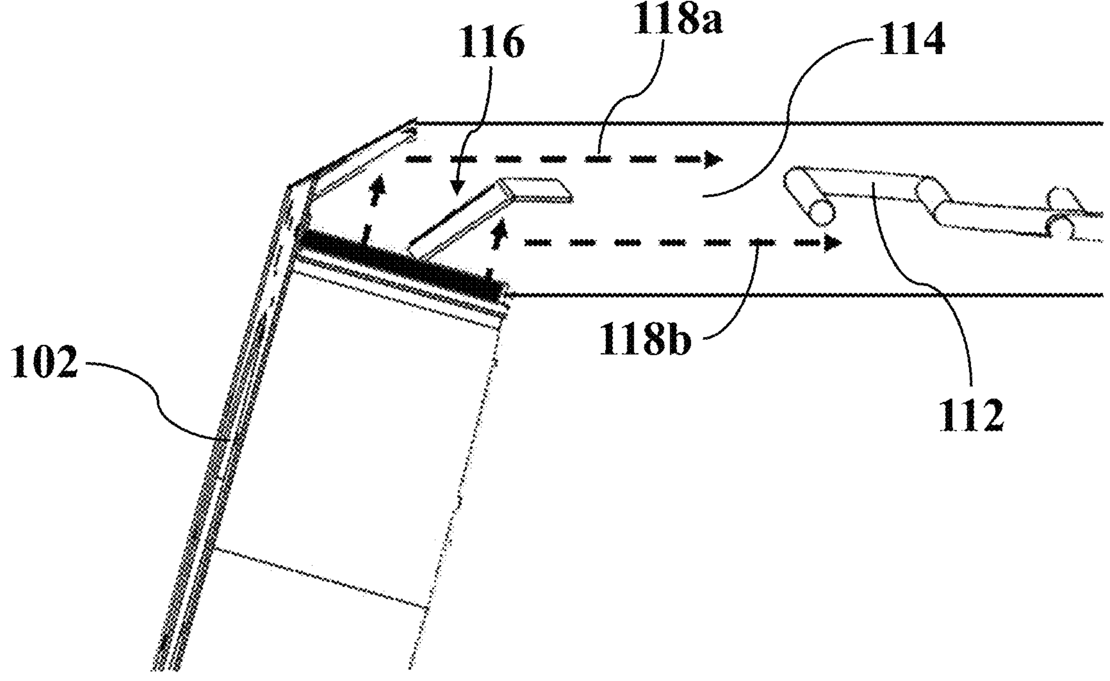
FIG. 6C is a cross-sectional view of a portion of the hot air oven from FIG. 6A.

As also shown in FIG. 6B, boost heater 112 is suspended above top air inlet plate 106 in top plenum 114. Heated air from a base heater (not shown) is directed by top blower 102 over an air diverter 116 that separates the air exiting top blower 102 into top and bottom airstreams 118*a*, 118*b* flowing, respectively, above and below boost heater 112 in top plenum 114, as shown more clearly in FIG. 6C. The use of air diverters is known in the art. Top air inlet plate 106 may also include a reverse-C-shaped baffle 120 which collects and redirects the top and bottom airstreams 118*a*, 118*b* above and below boost heater 112 and directs them to the openings in top air inlet plate 106. These disruptions to the air flow from top blower 102 make the air within top plenum 114 turbulent before it passes through the openings in top air inlet plate 106 as it is directed towards the top surface of the food item in cooking cavity 122 (see FIG. 6A).

Figure 6D:
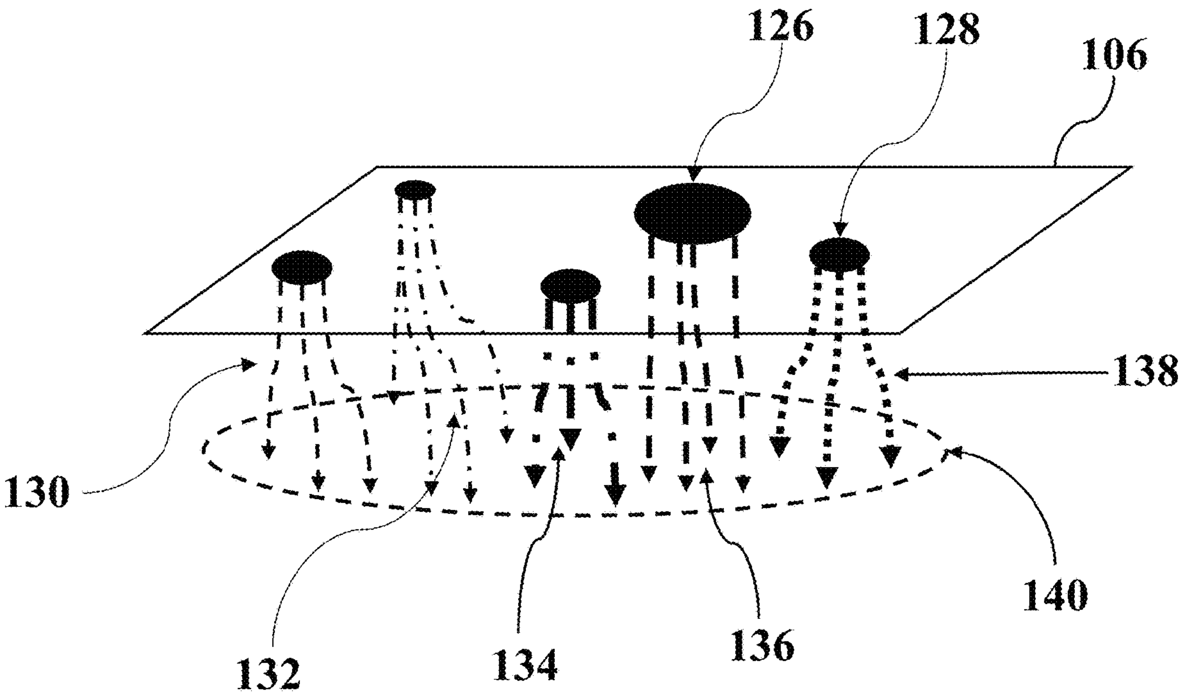
FIG. 6D depicts representations of non-laminar air streams in the cooking cavity of the hot air oven from FIG. 6A.

As described above, the pressurized, turbulent heated air formed within top plenum 114 is subsequently directed to cooking cavity 122 via multiple openings located in top air inlet plate 106. As shown in FIGS. 6B and 6D, in embodiments, and as is known in the art, not all of the openings in top air inlet plate 106 will necessarily have the same dimensions (e.g., diameter). For example, as shown in area 124 of top air inlet plate 106, openings 126 have a larger diameter than openings 128. In embodiments, the diameters of circular openings may vary by approximately 100%. Furthermore, as shown in areas 124 and 130 of top air inlet plate 106, and as is known in the art, the openings in top air inlet plate 106 may be irregularly spaced (i.e., spaced at non-uniform distances from each other). In embodiments, the spacing of the openings may vary by approximately 300%.

As shown in FIG. 6D, the streams of heated air 130, 132, 134, 136, 138 exiting the openings (for example, openings 126 and 128) of top air inlet plate 106 will have varying diameters, varying velocities, varying spacings between them, and varying directions as they exit the openings in top air inlet plate 106 and travel the distance from top air inlet plate 106 to the top surface 140 of the food item in cooking cavity 122.

The heating and airflow system shown in FIGS. 6A-6D provides streams of non-laminar airflow directed into the cooking cavity 122 from the exits of the multiple openings located in top air inlet plate 106. The use of streams of non-laminar heated air coming into cooking cavity 122 from the openings in top air inlet plate 106 allows for even air coverage across the top surface 140 of the food item, without spotting, while cooking the food item at the same speeds as ovens known in the art, but without having to move the food item relative to the streams of non-laminar heated air during cooking.

One of ordinary skill in the art will readily understand from the above description how pressurized, turbulent heated air is likewise formed within bottom plenum 142 of hot air oven 100. As shown in FIG. 6A, a boost heater 144 is suspended below bottom air inlet plate 110 in bottom plenum 142. Heated air from a base heater (not shown) is directed by bottom blower 108 over an air diverter (not shown) that separates the air exiting bottom blower 108 into top and bottom airstreams (not shown) flowing, respectively, above and below boost heater 144 in bottom plenum 142. Bottom air inlet plate 110 may also include a reverse-C-shaped baffle (similar to baffle 120 described above) which collects and redirects the top and bottom airstreams above and below boost heater 144 in bottom plenum 142 and directs them to the openings in bottom air inlet plate 110.

As with the pressurized, turbulent heated air formed within top plenum 114, pressurized, turbulent heated air formed within bottom plenum 142 is subsequently directed to cooking cavity 122 via multiple openings located in bottom air inlet plate 110. As with top air inlet plate 106, not all of the openings in bottom air inlet plate 110 will necessarily have the same diameter. Furthermore, the openings in bottom air inlet plate 110 may also be irregularly spaced (i.e., spaced at non-uniform distances from each other).

Like the streams of heated air 130, 132, 134, 136, 138 exiting the openings of top air inlet plate 106, the streams of heated air exiting the openings of bottom air inlet plate 110 will have varying diameters, varying velocities, varying spacings between them, and varying directions as they exit the openings in bottom air inlet plate 110 and travel the distance from bottom air inlet plate 110 to the bottom surface of the food item in cooking cavity 122. The use of streams of non-laminar heated air coming into cooking cavity 122 from the openings in bottom air inlet plate 110 promotes more even air coverage across the bottom surface of the food item. However, the distance from bottom air inlet plate 110 to the bottom surface of the food item in cooking cavity 122 is typically less than the distance from top air inlet plate 106 to the top surface 140 of the food item. As a result of this difference in distance, spotting may still occur on the bottom surface of the food item. Nonetheless, since the bottom surface of the food item is typically not seen by those who purchase and consume the food item, the presence of spotting on the bottom surface of the food item is usually not considered a problem.

One of ordinary skill in the art will also readily understand from the above description that a heating and airflow system as described above may be implemented in a hot air oven using only one blower (e.g., top blower 102 of hot air oven 100).

E. Microwave Oven

Figure 7A:
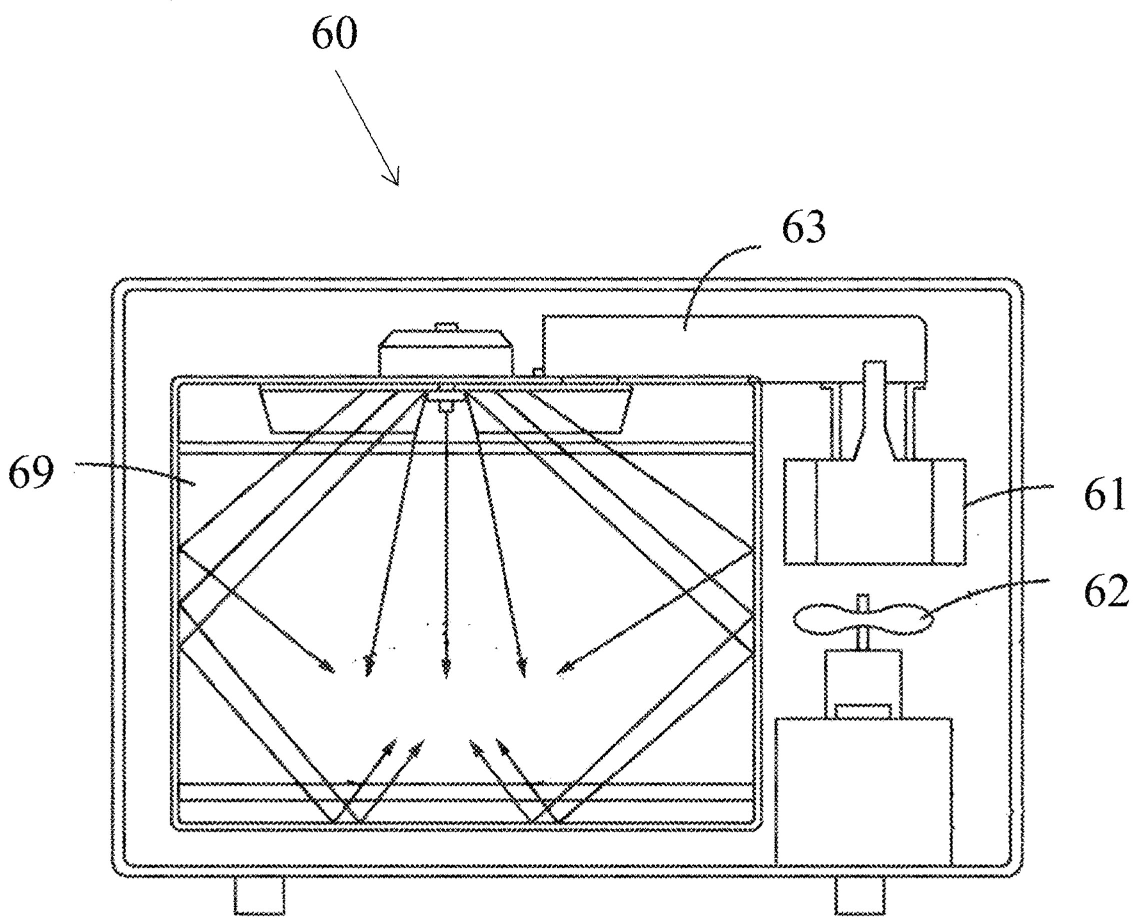
FIG. 7A is a front cross-sectional view of a microwave oven within the modular cooking appliance from FIG. 1, according to one embodiment.

With reference now to FIG. 7A, there is illustrated a front cross-sectional view of a microwave oven within interchangeable cooking module 12*c* of modular cooking appliance 10 from FIG. 1, according to one embodiment. As shown, a microwave oven 60 includes a cooking chamber 69 and at least one magnetron 61 configured to generate microwave radiation for cooking chamber 69. Microwave oven 60 may also include a second magnetron (not shown) that may be activated concurrently with, or independently from magnetron 61. Microwave oven 60 may further include one or more fans 62 for cooling magnetron 61 and/or generate air flow for more even heat distribution within cooking chamber 69. In some embodiments, microwave oven 60 further includes a waveguide 63 configured to direct and/or distribute the microwave radiation generated by magnetron 61 into cooking chamber 69.

Figure 7B:
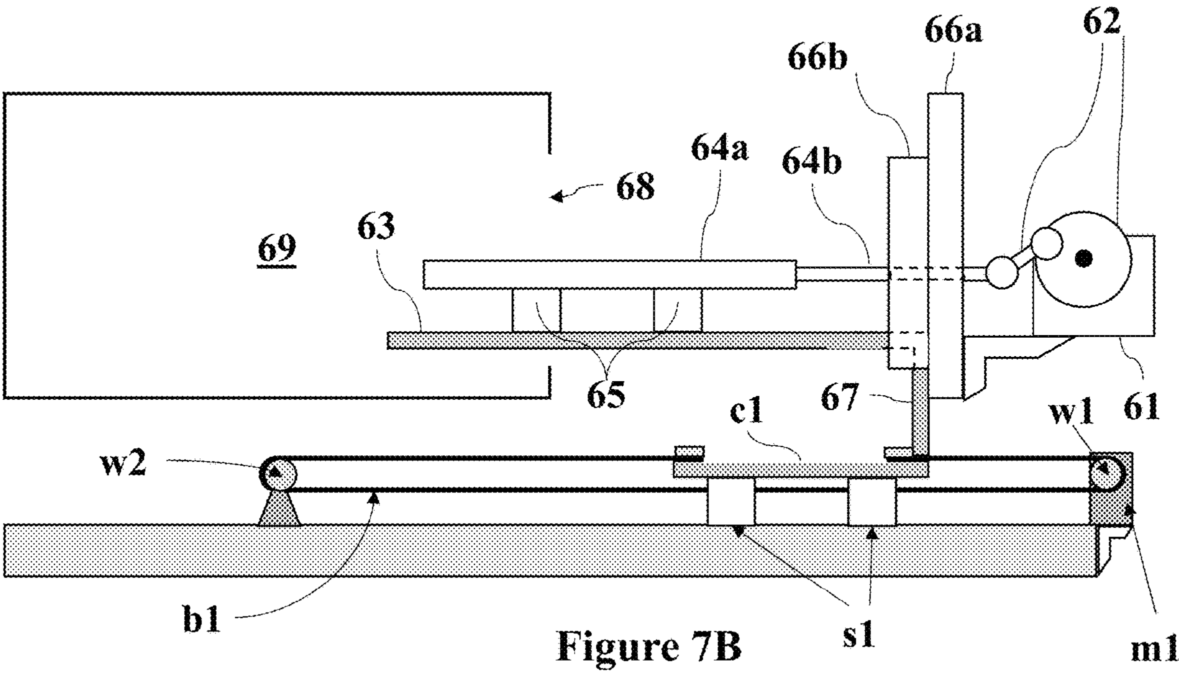
FIGS. 7B-7D are cross-sectional views of a food loading system within the microwave oven from FIG. 7A, according to one embodiment.
Figure 7C:
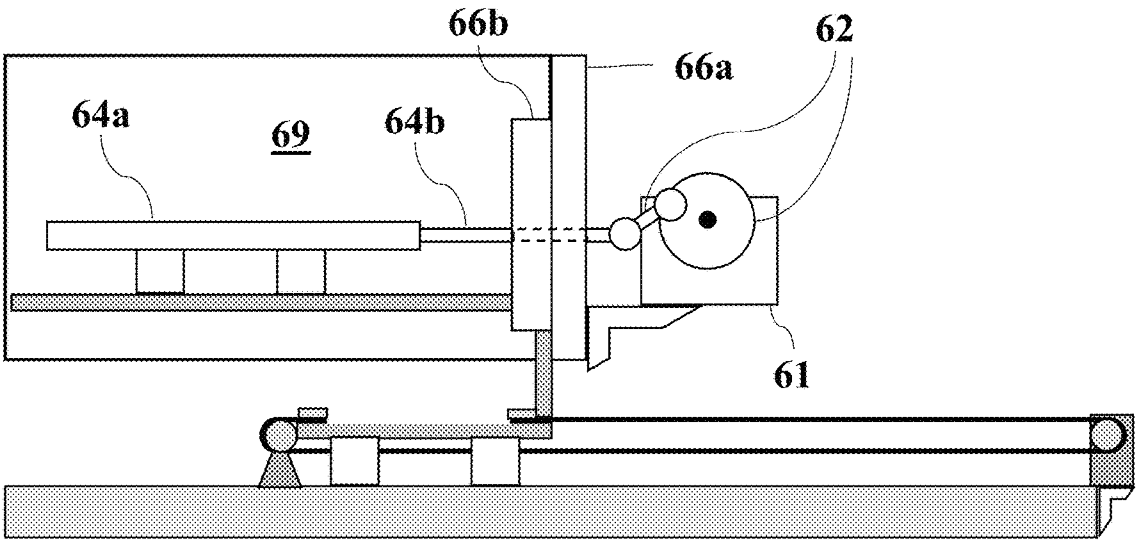
Figure 7D:
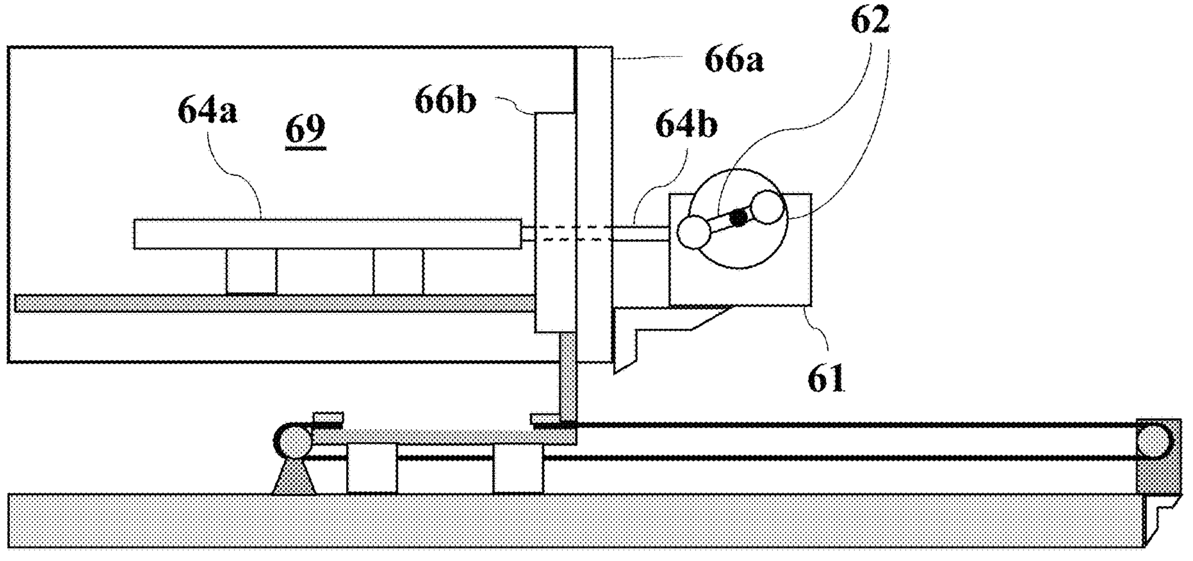

With reference now to FIGS. 7B-7D, there is illustrated cross-sectional views of a food transport and cooking evenness mechanism for microwave oven 60, according to one embodiment. As shown, a platform 63 is connected to a food transport carriage c1 via a connector 67. Platform 63 can be transported in and out of cooking cavity 69 by a belt drive mechanism that includes a belt b1, a belt drive wheel w1 that is driven by a belt drive motor ml and an opposing belt wheel w2. Carriage c1 is connected to carriage skids s1. For the present embodiment, there are four carriage skids connected to carriage c1, with two front carriage skids s1, as shown in FIG. 7B, and two back carriage skids (not shown) on the opposing side of carriage c1. Belt b1 moves between front carriage skids s1 and back carriage skids. When belt drive motor ml is engaged, belt b1 moves carriage c1, thereby transporting platform 63 in and out of cooking cavity 69 through opening 68, as shown in FIG. 7B.

Food surface 64*a* is connected to and supported by skids 65 which rest on platform 63. Food may be placed directly on food surface 64*a* or preferably on a dish or plate (not shown) which is then placed on food surface 64*a*. Food surface 64*a* is connected to crank-and-cam mechanism 62 via rod 64*b* which penetrates door 66*a* and door shunt 66*b*.

During cooking, as shown in FIGS. 7C-7D, food surface 64*a* may be moved to and fro within cooking chamber 69 for promoting food cooking evenness. In order to move food surface 64*a* to and fro within cooking chamber 69, a motor 61 and a crank-and-cam mechanism 62 are utilized to move a rod 64*b* connected to food surface 64*a*. Motor 61 is located outside an oven door formed by an external cover 66*a* and an internal cover 66*b*. External cover 66*a* and internal cover 66*b* are specifically designed to prevent microwave radiation from escaping through opening 68 during the cooking process. Two small concentric openings, which are approximately 0.3 inch in diameter, are provided in external cover 66*a* and internal cover 66*b* to allow rod 64*b* to go through. The wavelength of microwaves is approximately 12 cm, and the diameter of each of the two small concentric openings needs to be small enough to prevent microwave radiation from escaping through the openings. During the cooking process, crank-and-cam mechanism 62 translates the rotational movement from motor 61 into a linear reciprocating movement to move food surface 64*a* to and fro within cooking chamber 69. Food surface 64*a* can be moved on top of platform 63 via skids 65.

For the present embodiment, motor 61 and crank-and-cam mechanism 62 are utilized to translate a rotational movement to a linear reciprocating movement. It is understood by those skilled in the art that other mechanisms can be utilized to translate a rotational movement to a linear reciprocating movement, or to provide a linear reciprocating movement directly.

Operating parameters for microwave oven 60 to cook any food items placed within cooking cavity 69 can be entered via control panel 17 (from FIG. 1).

II. Controller

Modular cooking appliance 10 may include various oven types, but it is also able to be powered by a single-phase 50-Amp outlet as sole power source via a single power plug. Thus, modular cooking appliance 10 can be employed by any food service establishments without additional modification to the commonly found single-phase 50-Amp outlets.

Figure 8:
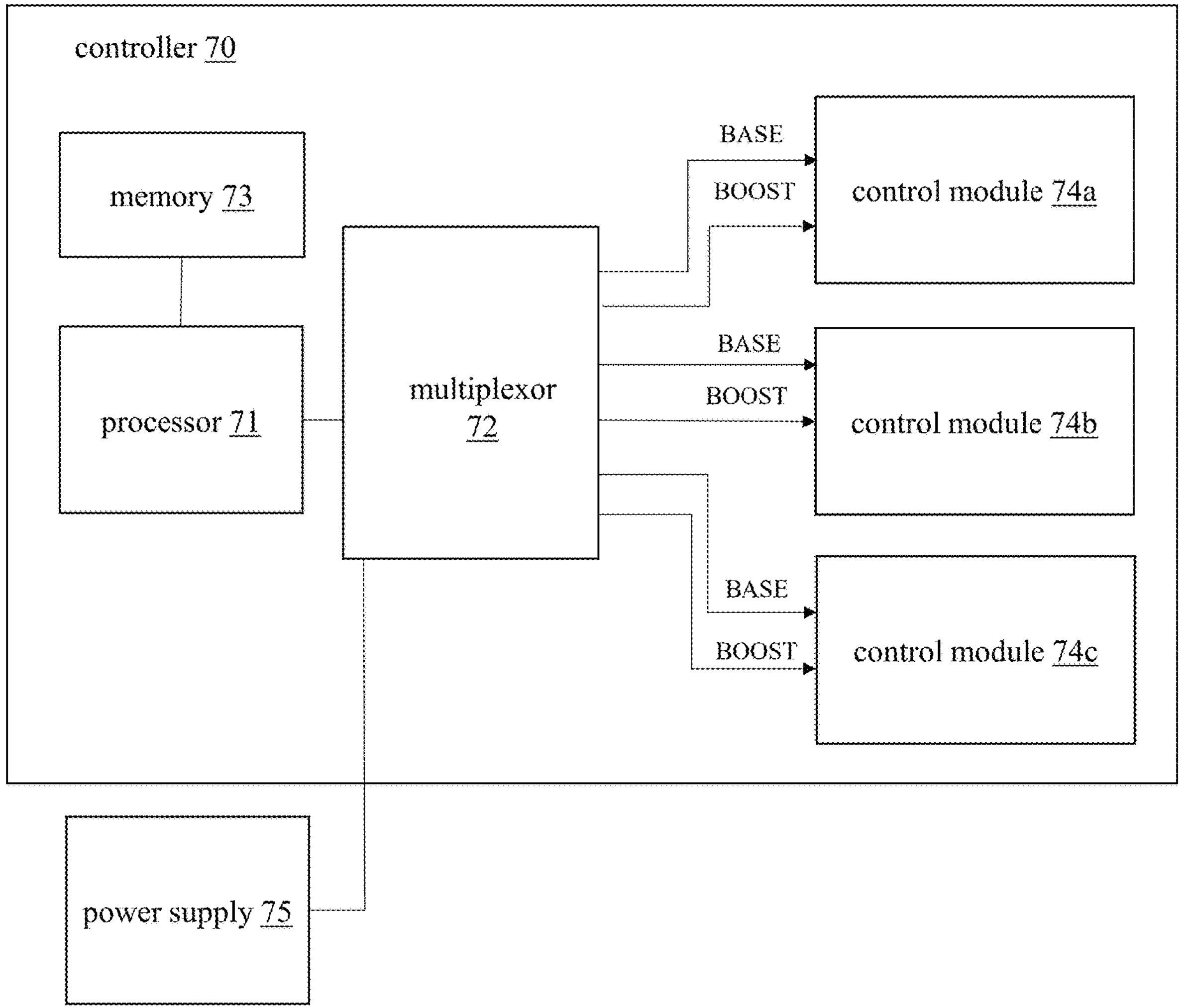
FIG. 8 is a block diagram of a controller for controlling various oven modules within the modular cooking appliance from FIG. 1, according to one embodiment.

Referring now to FIG. 8, there is depicted a block diagram of a controller for controlling various oven modules within modular cooking appliance 10, according to one embodiment. As shown, a controller 70 includes a processor 71, a multiplexor 72, a memory 73 and control modules 74*a*-74*c*. Memory 73 includes random-access memories and read-only memories that are non-erasable as well as electronically programmable. Software and data related to the operations of modular cooking appliance 10 are stored within memory 73. Control module 74*a* is associated with interchangeable cooking module 12*a* (from FIG. 1A), control module 74*b* is associated with interchangeable cooking module 12*b*, and control module 74*c* is associated with interchangeable cooking module 12*c*. During operation, control modules 74*a*-74*c* monitor the real-time current consumption of interchangeable cooking modules 12*a*-12*c*, respectively, and distribute current from a power supply 75 to interchangeable cooking modules 12*a*-12*c* and the associated ovens, as needed.

All ovens within modular cooking appliance 10 that cook with hot air, such as impingement oven 20 and convection oven 40, are provided with a base heater and at least one boost heater. For example, impingement oven 20 includes base heater 39*a* and boost heater 39*b* (see FIG. 3). All ovens within modular cooking appliance 10 that cook with microwaves, such as microwave oven 60, are provided with at least one magnetron. For example, microwave oven 60 includes magnetron 61 (see FIG. 7). If microwave oven 60 is provided with a second magnetron, it may be activated independently from magnetron 61.

III. Adaptive Power Management

As mentioned above, modular cooking appliance 10 is configured with impingement oven 20, convection oven 40 and microwave oven 60, for the present embodiment, with all the ovens operating from a single-phase 50-Amp outlet commonly found in commercial kitchens. However, those skilled in the art will appreciate that modular cooking appliance 10 may have any number and types of ovens all powered by a single power plug. For the present embodiment, the maximum current drawn by each of impingement oven 20, convection oven 40 and microwave oven 60 are as follows:

| | component | max. current drawn |
|---|---|---|
| impingement oven 20 | base heater | 8 Amps |
| | first boost heater | 12 Amps |
| | second boost heater | 12 Amps |
| convection oven 40 | base heater | 4 Amps |
| | first boost heater | 12 Amps |
| | second boost heater | 12 Amps |
| microwave oven 60 | first magnetron | 8 Amps |
| | second magnetron | 8 Amps |

In addition, the baseline current drawn by all the ancillary components (such as processor 71, multiplexor 72, memory 73, etc.) within modular cooking appliance 10 during operation is 5 Amps. Thus, with a 50-Amp power source, a maximum of (50-5=) 45 Amps current is available for powering ovens at any given time.

Needless to say, there are many benefits if more than one oven within modular cooking appliance 10 can be utilized to cook food items at the same time. However, as shown above, the maximum current drawn by impingement oven 20 is (8+12+12=) 32 Amps, and the maximum current drawn by convection oven 40 is (4+12+12=) 28 Amps. Thus, it is not possible to use both impingement oven 20 and convection oven 40 for cooking food items at the same time because the total current drawn by the two ovens (and all the ancillary components) would exceed the 50-Amp limitation.

In order to overcome the above-mentioned 50-Amp barrier, modular cooking appliance 10 employs Adaptive Power Management™ (APM) technology to intelligently allocate current to each of the ovens such that multiple ovens can be utilized for cooking food items concurrently during some of the time. There are two control modes under APM, namely, temperature-control mode and time-control mode.

A. Temperature-Control Mode

When cooking a food item under temperature-control mode, the oven temperature is monitored, and a temperature-control feedback loop is utilized to control the oven temperature for cooking the food item. Specifically, the base and boost heaters within an associated oven are turned on when the measured oven temperature drops below a set cook temperature, and the base and boost heaters within the associated oven are turned off when the measured oven temperature is at or above the set cook temperature.

During temperature-control mode, the amount of time an oven is turned on and the associated current drawn during the cook cycle are recorded and stored in a Current Drawn History Table (more details below) to be used in time-control mode described below, when necessary.

B. Time-Control Mode

When cooking a food item under time-control mode, the oven temperature and time for cooking the food item are guided by the information previously stored in a Current Drawn History Table (more details below). Specifically, the base and boost heaters within an associated oven are allocated the power during each time unit that was consumed by that oven for cooking the same food item when operating under temperature-control mode, as recorded in the Current Drawn History Table.

IV. Control Tables

The following three control tables are utilized by modular cooking appliance 10 to perform APM during various cook cycles. The control tables can be stored in memory 73 (from FIG. 8), and the information within some of the control tables will be updated throughout the course of operating modular cooking appliance 10.

A. Food Entry Table

Before modular cooking appliance 10 can be deployed for cooking different types of food items, information regarding these food items has to be entered and stored (i.e., pre-programmed) in a Food Entry Table (FET) within memory 73. The FET contains a list of all the food items that can be cooked via the various ovens within modular cooking appliance 10 and their respective optimal cook settings. Basically, for each food item intended to be cooked via modular cooking appliance 10, an operator needs to enter into the FET a food item name, an oven type and cook settings (such as cook time, blower speed, cook temperature, etc.) that are associated with the food item.

With reference now to FIG. 9A, there is depicted an example FET, according to one embodiment. In this FET example, four types of food items are listed, namely, pizza, sandwich, biscuits and hot dog. In addition, three separate cook stages are shown, and each cook stage contains cook settings such as start and stop times, cook temperature, blower speed and magnetron power level. Specifically, entry one and entry two include the cook settings for cooking pizza and sandwich, respectively, in an impingement oven (such as impingement oven 20). Entry three includes the cook settings for cooking biscuits in a convection oven (such as convection oven 40) and entry four includes the cook settings for cooking hot dog in a microwave oven (such as microwave oven 60).

For each of entry one through entry three, when the corresponding cook settings are deployed, the ovens will be engaged in hot air cooking, as indicated by the associated air temperatures and blower speeds. For entry four, when that cook setting is deployed, the microwave oven will be engaged in microwave cooking, as indicated by a magnetron setting greater than zero in stages 1 and 3.

B. Maximum Current Drawn Table

The Maximum Current Drawn Table contains the maximum current required for each of impingement oven 20, convection oven 40 and microwave oven 60 to cook various food items, corresponding to the food item list stored in the FET.

With reference now to FIG. 9B, there is depicted an example Maximum Current Drawn Table. As shown, the Maximum Current Drawn Table includes an oven module column, a food name column, and multiple cook stage columns. In this example, entry one includes the maximum current drawn by impingement oven 20 for cooking pizza for a duration of 90 seconds, which corresponds to entry one of the FET from FIG. 9A. Entry two includes the maximum current drawn by impingement oven 20 for cooking sandwich for a duration of 70 seconds, which corresponds to entry two of the FET from FIG. 9A. Entry three includes the maximum current drawn by convection oven 40 for cooking biscuits for a duration of 120 seconds, which corresponds to entry three of the FET from FIG. 9A. Entry four includes the maximum current drawn by microwave 60 for cooking hot dog for a duration of 90 seconds, which corresponds to entry four of the FET from FIG. 9A.

The information stored in the Maximum Current Drawn Table will be utilized to assist in the determination of whether or not a cook process should start when two or more ovens are called for cooking food items under temperature-control mode (as will be further explained in FIG. 9).

C. Current Drawn History Table

The Current Drawn History Table contains the current drawn by each of impingement oven 20 and convection oven 40 when it is engaged for cooking each type of food items under temperature-control mode per cook cycle.

With reference now to FIG. 9C, there is depicted an example Current Drawn History Table. As shown, the Current Drawn History Table includes an oven module column, a food name column, and multiple time unit columns. Each of the time units (time unit 1 to time unit 8 in this example) are identical in the length of time, and each time unit can be one second, two seconds, etc., depending the time resolution required and the memory available within modular cooking appliance 10. The current drawn by each of impingement oven 20 and convection oven 40 when it is engaged for cooking a specific food item is recorded and stored in various time units accordingly throughout its entire cook cycle.

The current drawn value recorded in each time unit can be a running average of the current drawn of the most recent 10 cooks of each food item. For example, the 3.2 Amps current drawn value in time unit 1 is a running average of the current drawn of the most recent 10 cooks of pizza in time unit 1 by impingement oven 20. An operator can change the number of cooks for calculating the running average, and more than 10 cooks can be utilized to calculate the running average, depending on the accuracy needed.

Basically, modular cooking appliance 10 learns how much current was recently required in each time unit to cook each food item type in each of impingement oven 20 and convection oven 40 when cooking under temperature-control mode.

It is expected that the current drawn value recorded in each time unit may be drastically different even for the same oven, depending on the geographic location of the oven. For example, the current drawn values for an oven located in Denver, Colorado is expected to be significantly higher than the same oven located in Dallas, Texas. Thus, before the Current Drawn History Table can be fully deployed for regular day-to-day operations, it has to be initialized and populated with some actual historic current drawn values by performing a minimum number of pre-cooks, such as 3, on location.

Figure 10:
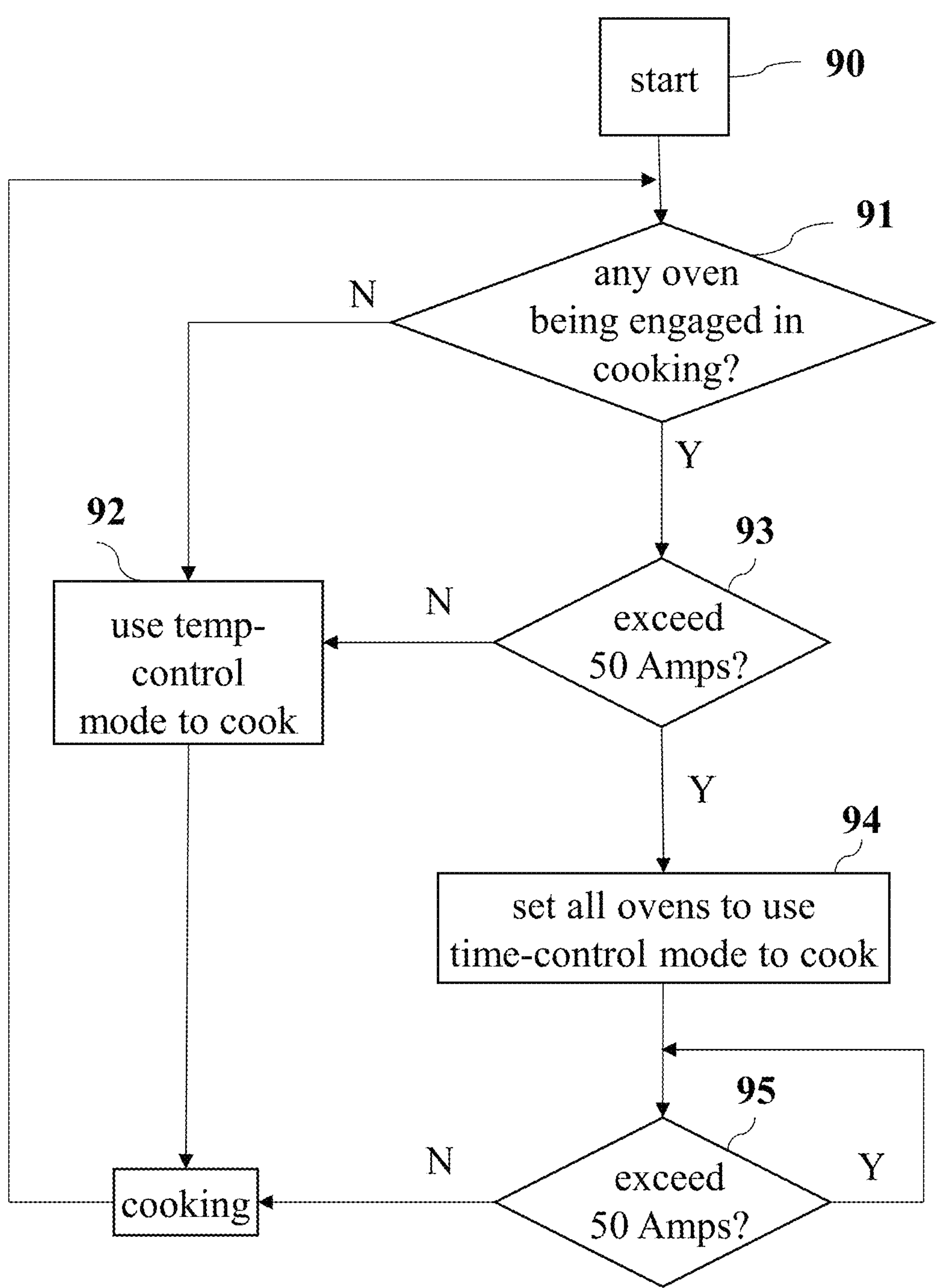
FIG. 10 is a flow diagram of a method for cooking food items via the modular cooking appliance from FIG. 1, according to one embodiment.

The information stored in the Current Drawn History Table will be utilized to assist in the determination of whether or not a cook process should be started when two or more ovens are called for cooking food items (as will be further explained in FIG. 10).

In addition, for each time unit, the activation status of the associated base heater and boost heater (not shown) can also be recorded and stored in the corresponding entry of the Current Drawn History Table.

IV. Cooking Process

With reference now to FIG. 10, there is depicted a flow diagram of a method for cooking food items via modular cooking appliance 10, according to one embodiment. The ovens within modular cooking appliance 10 depends on the user configuration, but for the present embodiment, the ovens are impingement oven 20, convection oven 40 and microwave oven 60. After an operator has selected a food item to be cooked from a list of food items (i.e., food items stored in a FET from FIG. 9A) shown on display 17 (from FIG. 1), as shown in block 90, a determination is made whether or not any of the ovens is currently being engaged in cooking food items, as shown in block 91.

If none of the ovens is currently engaged in cooking food items, then temperature-control mode will be utilized for controlling the oven temperature of the selected oven to cook the selected food item throughout the entire cook process, as depicted in block 92. The cook cycle will be guided by the information stored within the FET.

However, if one (or more) oven is currently being engaged in cooking food items, then another determination is made whether or not the total current demand by the selected oven and the engaged oven (as well as the auxiliary components) to cook respective food items will exceed the 50-Amp limitation anytime during their entire respective cook cycle under temperature-control mode, as shown in block 93. This determination is made by looking up the Maximum Current Drawn Table to determine if the sum of the current drawn by the selected oven and the engaged oven (as well as the auxiliary components) for cooking their respective food item will exceed the 50-Amp limitation in any of the time units, for the same ovens cooking the same food types. If not, then the selected oven is allowed to cook the selected food immediately, and temperature-control mode can continually be used to control the oven temperature of the two ovens throughout the entire cook cycle, as depicted in block 92.

If the total current demand by the selected oven and the engaged oven (as well as the auxiliary components) to cook respective food items exceeds the 50-Amp limitation, then all the ovens will be set to use time-control mode for controlling oven temperature throughout the entire cook cycle, as depicted in block 94. In other words, any oven that is using temperature-control mode at the time will be switched to use time-control mode to complete the cook process.

For example, if a pizza is currently being cooked in impingement oven 20, and an operator wants to cook a biscuit in convection oven 40 at the same time, controller 70 checks the maximum current drawn by impingement oven 20 when cooking a pizza and the maximum current drawn by convection oven 40 when cooking a biscuit, by using the Maximum Current Drawn Table. In this example, the maximum current drawn by impingement oven 20 when cooking a pizza is 32 Amps, and the maximum current drawn by convection oven 40 when cooking a biscuit is 28 Amps, with a total maximum current drawn being (32+28=) 60 Amps, which means the cooking control within impingement oven 20 will be switched to time-control mode.

Next, a determination is made whether or not the total current demand by the selected oven and the engaged oven (as well as the auxiliary components) to cook respective food items will exceed the 50-Amp limitation anytime in any of the time units during their entire respective cook process under time-control mode, as shown in block 95. This determination is made by looking up the Current Drawn History Table to determine if the sum of the current drawn by the selected oven and the engaged oven (as well as the auxiliary components) does not exceed the 50-Amp limitation in each and every time unit throughout the entire cook cycle.

If the total current demand by the selected oven and the engaged oven (as well as the auxiliary components) to cook respective food items exceeds the 50-Amp limitation in any of the time units during their entire respective cook process under time-control mode, the selected oven has to wait until the total historic current drawn in each subsequent time unit is 50 Amps or less before it can start its cook process. Otherwise, if the total current demand does not exceed the 50-Amp limitation in any of the time units, both the selected oven and the engaged oven proceed with respective cooking under time-control mode.

For example, Table I (a portion of a Current Drawn History Table) shows it takes five time units for impingement oven 20 to cook a pizza, and the current drawn during the first to fifth time units are 20, 32, 32, 32 and 8 Amps, respectively. On the other hand, it takes three time units for convection oven 40 to cook a biscuit, and the current drawn during the first to third time units are 28, 16 and 16 Amps, respectively.

TABLE I

| | time unit 1 | time unit 2 | time unit 3 | time unit 4 | time unit 5 |
|---|---|---|---|---|---|
| pizza | 20 | 32 | 32 | 32 | 8 |
| biscuit | 28 | 16 | 16 | | |

In this example, convection oven 40 can start cooking the biscuit in time unit 5 while the pizza is being cooked in impingement oven 20. This is because the current drawn by the two ovens and auxiliary components exceeds the 50-Amp limitation if biscuits begin cooking in any of time units 1-4 but not in time unit 5.

V. Uniform Operating Steps for Operators

The operating procedure is the same for all the ovens within modular cooking appliance 10.

For the present embodiment, modular cooking appliance 10 enters operating mode upon completion of oven startup, during which each of impingement oven 20, convection oven 40 and microwave oven 60 warm up to their preset operating temperatures. Once in operating mode, a listing of the various food items for which operating parameters have been entered via control panel 17 is displayed on control panel 17. An operator can select the food item to be cooked from among the items displayed on control panel 17 and places the food on a food loading mechanism of the corresponding oven. The food is then transported into the heated oven cavities for cooking.

After the cook process has been completed, the cooked food is transported from the oven cavities back to where the food entered the associated oven. The food loading mechanisms are not themselves heated, effectively concluding the cook process once the food exits the heated oven cavities. However, because the food loading mechanisms are adjacent to the heated oven cavities contained in interchangeable cooking modules 12a-12c, residual heat from the heated oven cavities contained in interchangeable cooking modules 12a-12c serves to reduce the rate of heat loss experienced by the recently cooked food.

Food items may be concurrently cooked in impingement oven 20, convection oven 40 and microwave oven 60 of modular cooking appliance 10. Similar food items may be consecutively cooked in impingement oven 20, convection oven 40 and microwave oven 60 of modular cooking appliance 10. For example, pizzas may be cooked back to back to back in impingement oven 20 while cinnamon rolls are being cooked back to back to back in convection oven 40 while breakfast sandwiches are being cooked back to back to back in microwave oven 60. In order for the amount of heat energy delivered to the similar food items cooked consecutively in the various ovens to be the same in each of the back to back to back cooks when modular cooking appliance 10 is powered by an electric circuit of no more wattage than a typical single-phase 50-Amp outlet, the volumes of the cook cavities held within interchangeable cooking modules 12a-12c are no larger than 1.5 cubic feet for the convection oven, 1.25 cubic feet for the impingement oven and 1 cubic feet for the microwave oven.

As has been described, the present invention provides a modular cooking appliance having multiple ovens.

While the invention has been particularly shown and described with reference to a preferred embodiment, it will be understood by those skilled in the art that various changes in form and detail may be made therein without departing from the spirit and scope of the invention.

What is claimed is:

1. A modular cooking apparatus, comprising:

a housing having a first interchangeable cooking module and a second interchangeable cooking module;

a first oven contained within said first interchangeable cooking module, said first oven including a cooking cavity and being configured to provide a plurality of non-laminar streams of heated air to said cooking cavity, wherein said first oven further includes:

a plenum disposed above said cooking cavity, said plenum including a baffle, a plate which defines a bottom of said plenum, and a heating element;

a blower for providing said heated air to said plenum, wherein said blower is disposed at an angle with respect to an axis that is perpendicular to said plate; and an air diverter;

wherein:

said air diverter separates said heated air from said blower into an upper airstream that flows above said heating element within said plenum and a lower airstream that flows below said heating element within said plenum;

said baffle redirects said upper airstream and/or said lower airstream toward said cooking cavity;

whereby said heated air from said blower is made turbulent within said plenum prior to being provided to said cooking cavity;

a second oven contained within said second interchangeable cooking module, wherein said second oven is a different oven type from said first oven; and a single power plug for receiving electrical power from a wall outlet.

2. The modular cooking apparatus of claim 1, wherein said cooking cavity has a length dimension of about 16 inches and a width dimension of about 16 inches.

3. The modular cooking apparatus of claim 1, wherein said angle is greater than about 10°.

4. The modular cooking apparatus of claim 3, wherein said angle is less than about 45°.

5. The modular cooking apparatus of claim 1, wherein said baffle redirects said upper airstream and/or said lower airstream to said plate.

6. The modular cooking apparatus of claim 1, wherein said plate comprises a plurality of openings, said plurality of openings having varying dimensions.

7. The modular cooking apparatus of claim 6, wherein said plurality of non-laminar streams of heated air exit said openings in varying directions.

8. The modular cooking apparatus of claim 1, wherein said plate comprises a plurality of circular openings having varying diameters.

9. The modular cooking apparatus of claim 1, wherein said plate comprises a plurality of openings, said plurality of openings being irregularly spaced.

10. The modular cooking apparatus of claim 1, wherein said plurality of non-laminar streams of heated air have varying diameters.

11. The modular cooking apparatus of claim 1, wherein said plurality of non-laminar streams of heated air have varying velocities.

12. The modular cooking apparatus of claim 1, wherein said plurality of non-laminar streams of heated air are irregularly spaced.

13. The modular cooking apparatus of claim 1, wherein said first oven is configured to cook a food item such that a top surface of said food item does not include spotting.

14. The modular cooking apparatus of claim 13, wherein said first oven is not configured to move said food item relative to said plurality of non-laminar streams of heated air during cooking of said food item.

15. A modular cooking apparatus, comprising:

a housing having a first interchangeable cooking module and a second interchangeable cooking module;

a first oven contained within said first interchangeable cooking module, said first oven including:

a cooking cavity;

a plenum disposed above said cooking cavity, said plenum including a baffle, a plate which defines a bottom of said plenum, and a heating element;

a blower for providing heated air to said plenum, wherein said blower is disposed at an angle with respect to an axis that is perpendicular to said plate; and an air diverter;

wherein:

said air diverter separates said heated air from said blower into an upper airstream that flows above said heating element within said plenum and a lower airstream that flows below said heating element within said plenum; and said baffle redirects said upper airstream and/or said lower airstream toward said cooking cavity;

whereby said heated air from said blower is made turbulent within said plenum prior to being provided to said cooking cavity;

a second oven contained within said second interchangeable cooking module, wherein said second oven is a different oven type from said first oven; and a single power plug for receiving electrical power from a wall outlet.

16. The modular cooking apparatus of claim 15, wherein said cooking cavity has a length dimension of about-16 inches and a width dimension of about 16 inches.

17. The modular cooking apparatus of claim 15, wherein said angle is greater than about 10°.

18. The modular cooking apparatus of claim 15, wherein said angle is less than about 45°.

19. The modular cooking apparatus of claim 15, wherein said baffle redirects said upper airstream and/or said lower airstream to said plate.

20. The modular cooking apparatus of claim 15, wherein said first oven is configured to provide a plurality of non-laminar streams of heated air from said plenum to said cooking cavity.

21. The modular cooking apparatus of claim 20, wherein said plurality of non-laminar streams of heated air have varying diameters.

22. The modular cooking apparatus of claim 20, wherein said plurality of non-laminar streams of heated air have varying velocities.

23. The modular cooking apparatus of claim 20, wherein said plurality of non-laminar streams of heated air are irregularly spaced.

24. The modular cooking apparatus of claim 20, wherein:

said plurality of non-laminar streams of heated air are provided from said plenum to said cooking cavity through a plurality of openings in said plate; and said plurality of non-laminar streams of heated air exit said plurality of openings in varying directions.

25. The modular cooking apparatus of claim 20, wherein said first oven is not configured to move a food item relative to said plurality of non-laminar streams of heated air during cooking of said food item.

26. The modular cooking apparatus of claim 15, wherein said plate comprises a plurality of openings, said plurality of openings having varying dimensions.

27. The modular cooking apparatus of claim 15, wherein said plate comprises a plurality of circular openings having varying diameters.

28. The modular cooking apparatus of claim 15, wherein said plate comprises a plurality of openings, said plurality of openings being irregularly spaced.

29. The modular cooking apparatus of claim 15, wherein said first oven is configured to cook a food item such that a top surface of said food item does not include spotting.

* * * * *